US012759574B2

(12) United States Patent
Saito

(10) Patent No.: US 12,759,574 B2
(45) Date of Patent: Oct. 13, 2026

(54) DRIVER ASSISTANCE APPARATUS, DRIVER ASSISTANCE METHOD, AND NON-TRANSITORY RECORDING MEDIUM

(71) Applicant: SUBARU CORPORATION, Tokyo (JP)

(72) Inventor: Takato Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 13 days.

(21) Appl. No.: 18/969,384

(22) Filed: Dec. 5, 2024

(65) Prior Publication Data

US 2025/0091601 A1 Mar. 20, 2025

Related U.S. Application Data

(63) Continuation of application No. PCT/JP2023/011473, filed on Mar. 23, 2023.

(51) Int. Cl.

| | |
|---|---|
| ***B60W 50/14*** | (2020.01) |
| ***B60K 35/21*** | (2024.01) |
| ***B60W 40/08*** | (2012.01) |

(52) U.S. Cl.

CPC ............ *B60W 50/14* (2013.01); *B60K 35/21* (2024.01); *B60W 40/08* (2013.01); *B60W 2050/146* (2013.01)

(58) Field of Classification Search

CPC ................ B60W 50/14; B60W 40/08; B60W 2050/146; B60K 35/21; B60K 2360/178;

(Continued)

(56) References Cited

U.S. PATENT DOCUMENTS

2020/0198644 A1* 6/2020 Hutchings ............ B60W 40/09
2021/0229707 A1* 7/2021 Akash .............. B60W 60/0059

(Continued)

FOREIGN PATENT DOCUMENTS

JP 2021-108073 A 7/2021

OTHER PUBLICATIONS

International Search Report (with English translation) and Written Opinion dated Jun. 13, 2023, from corresponding International Application No. PCT/JP2023/011473, 9 pages.

*Primary Examiner* — Curtis J King
(74) *Attorney, Agent, or Firm* — Rimon P.C.

(57) ABSTRACT

A driver assistance apparatus that assists a driver in driving a vehicle includes one or more processors. The processor acquires information on a surrounding environment of the vehicle, recognizes the surrounding environment based on the information, calculates a trust level of the driver in the driver assistance apparatus, and displays at least recognition result information. When the recognition result information is displayed, the processor changes the number of information items indicating a display area around the vehicle or a state of a detection object present around the vehicle in accordance with the trust level. The processor determines that the driver is in a standard trusting state when the trust level is less than or equal to a predetermined over-trust threshold and greater than or equal to a predetermined distrust threshold, and sets the display area to a first area when the driver is in the standard trusting state.

10 Claims, 19 Drawing Sheets

(58) Field of Classification Search
CPC ...... B60K 2360/179; B60K 2360/1868; B60K 35/00; B60K 35/10; B60K 35/22; B60K 35/28; B60K 35/29; B60K 35/81; G08G 1/16
See application file for complete search history.

(56) References Cited

U.S. PATENT DOCUMENTS

2022/0396287 A1* 12/2022 Akash .................. B60W 50/16
2023/0128456 A1* 4/2023 Natarajan ............ B60W 40/04
701/23

* cited by examiner

[ FIG. 1 ]
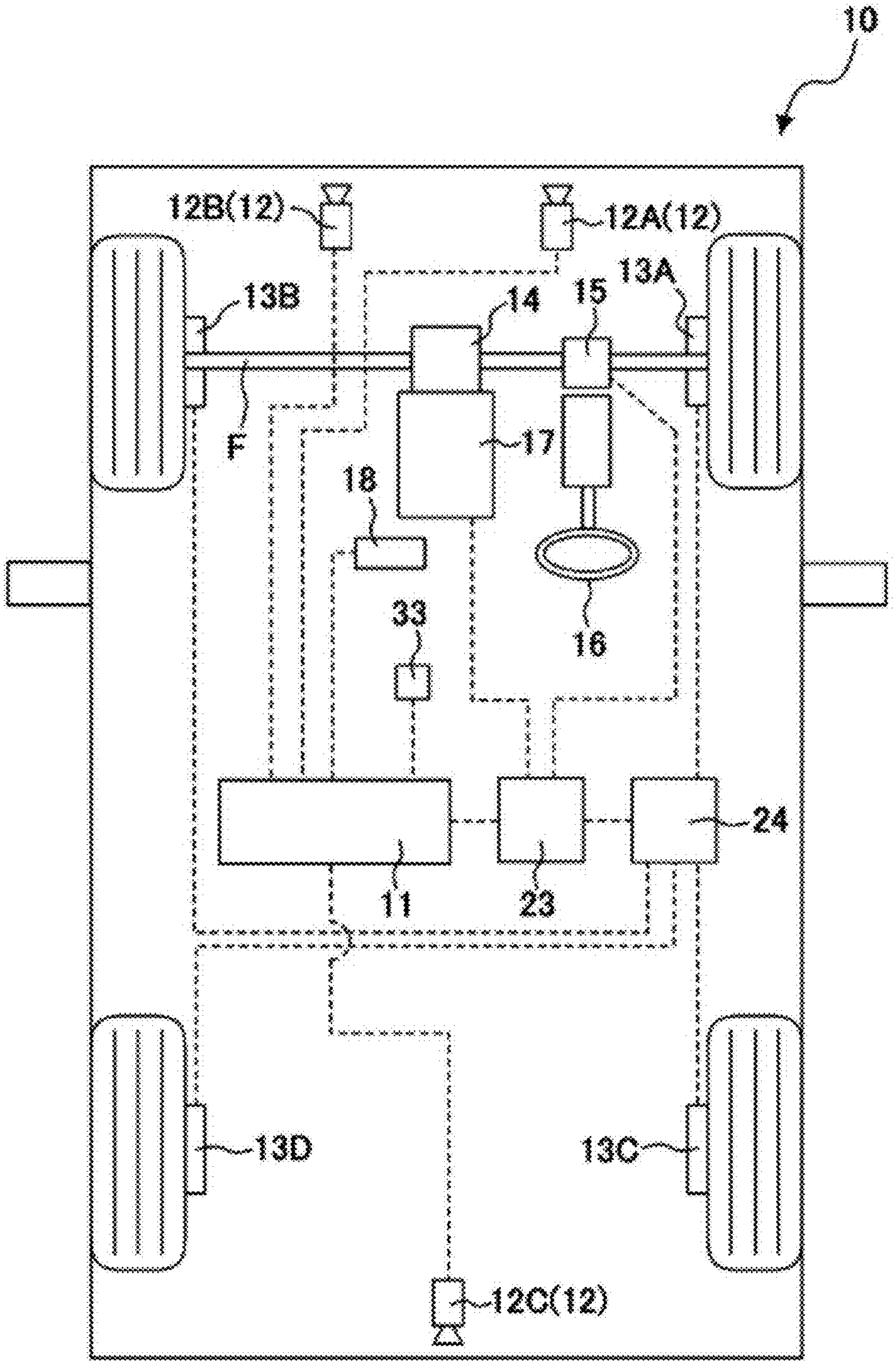

[ FIG. 2 ]
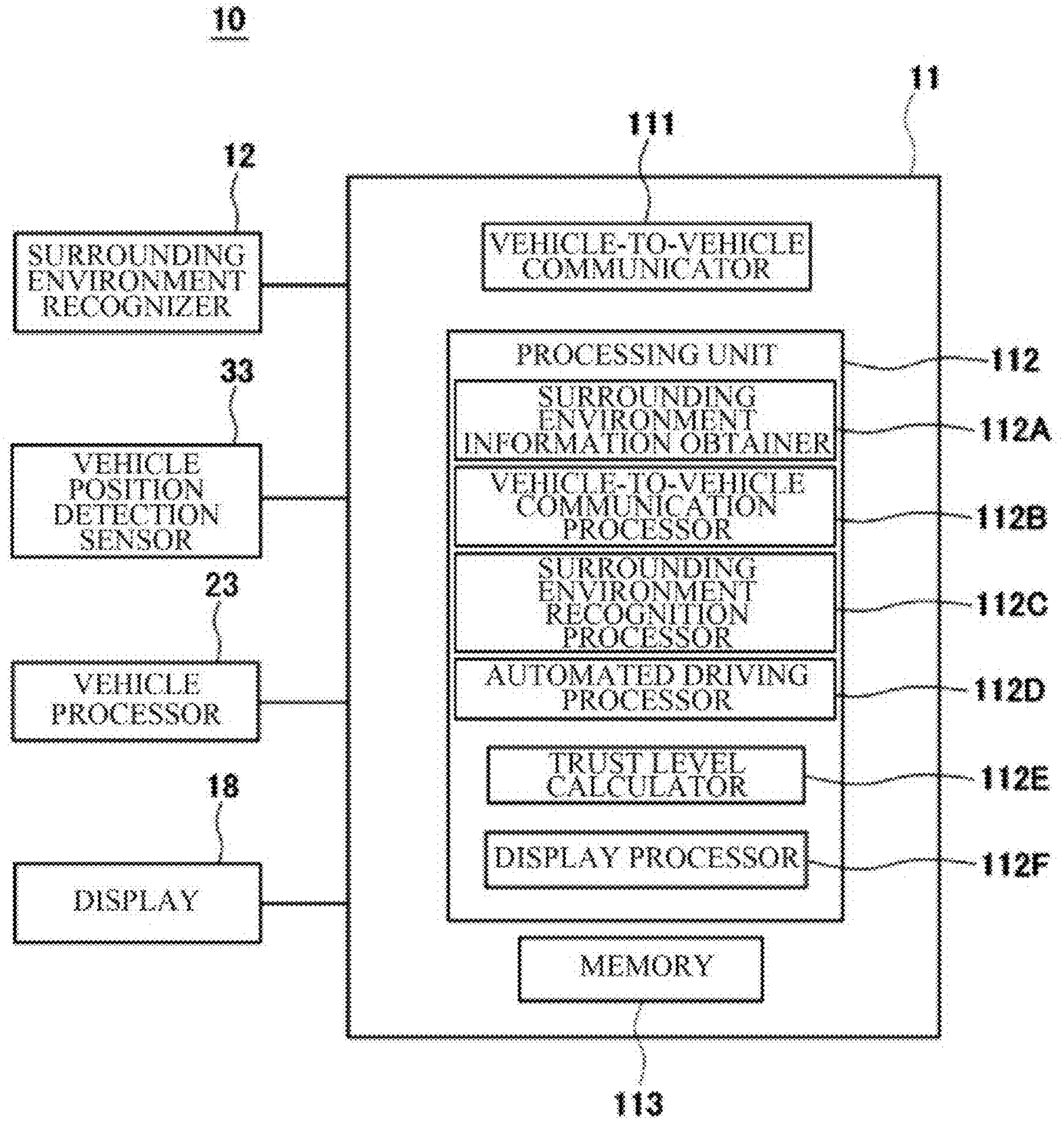

[ FIG. 3 ]
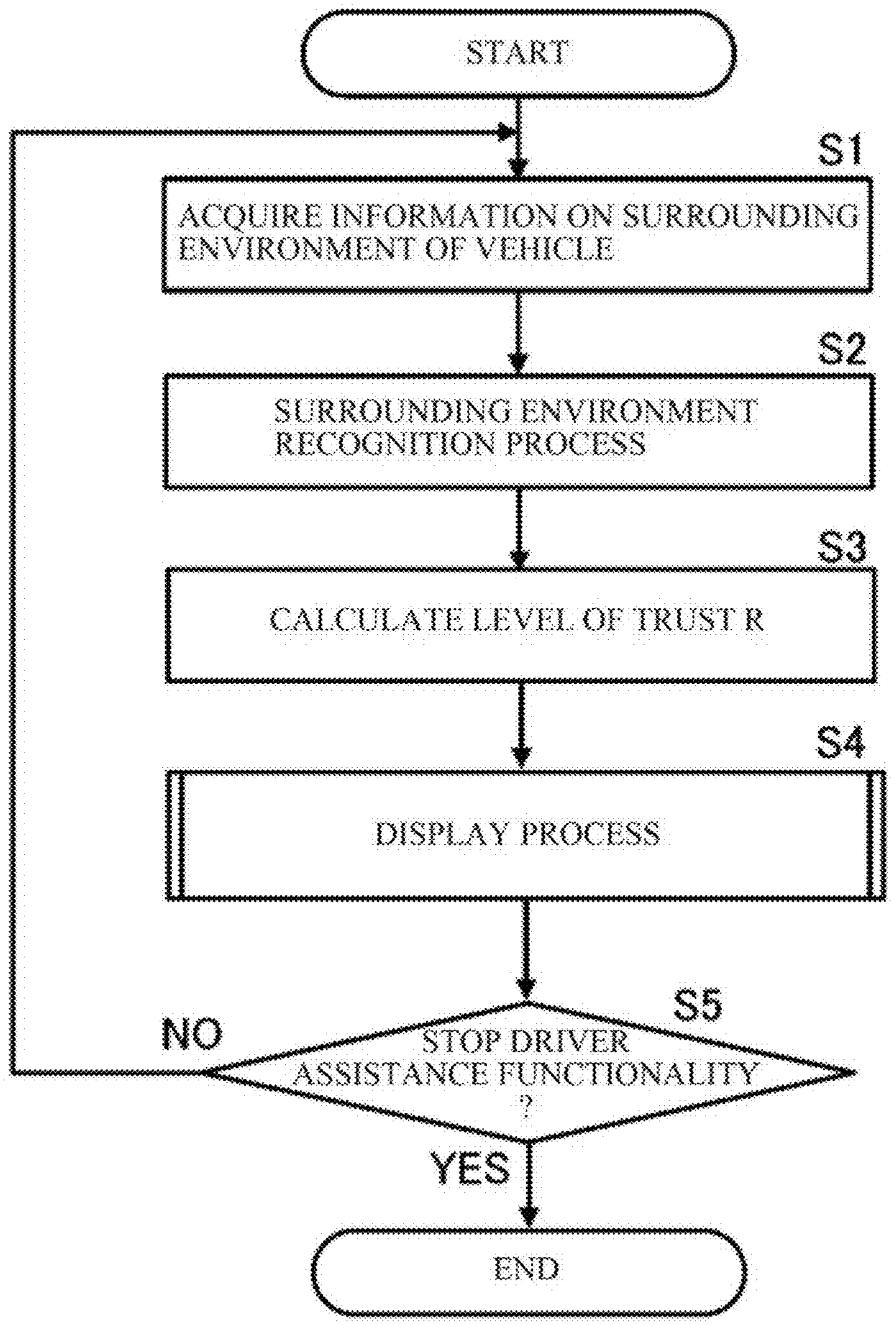

[ FIG. 4 ]
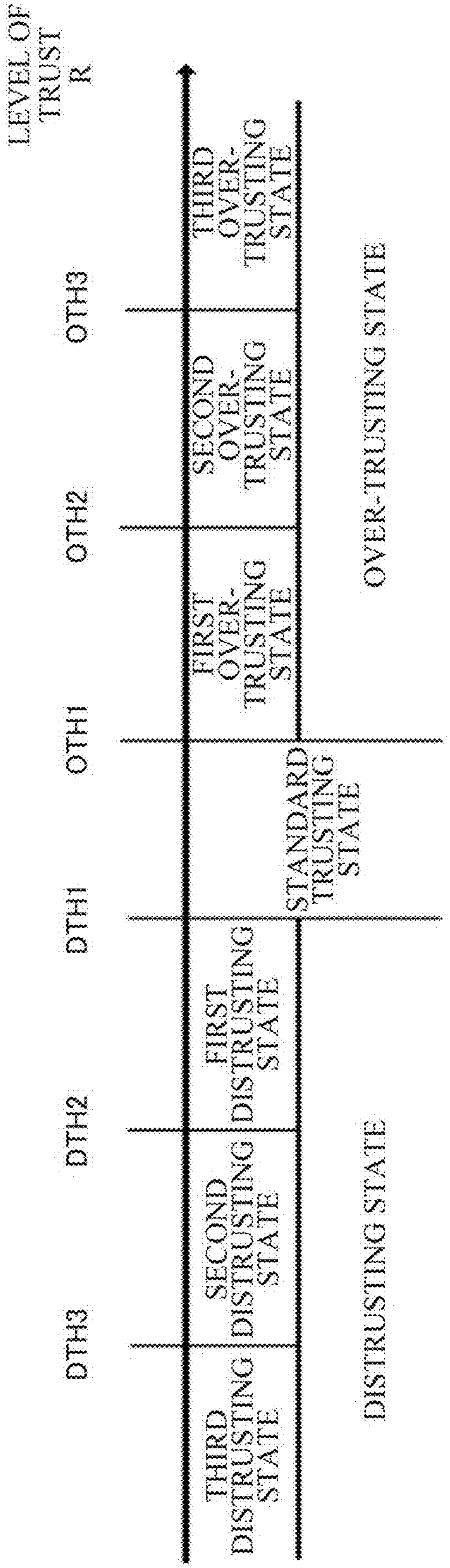

[ FIG. 5 ]
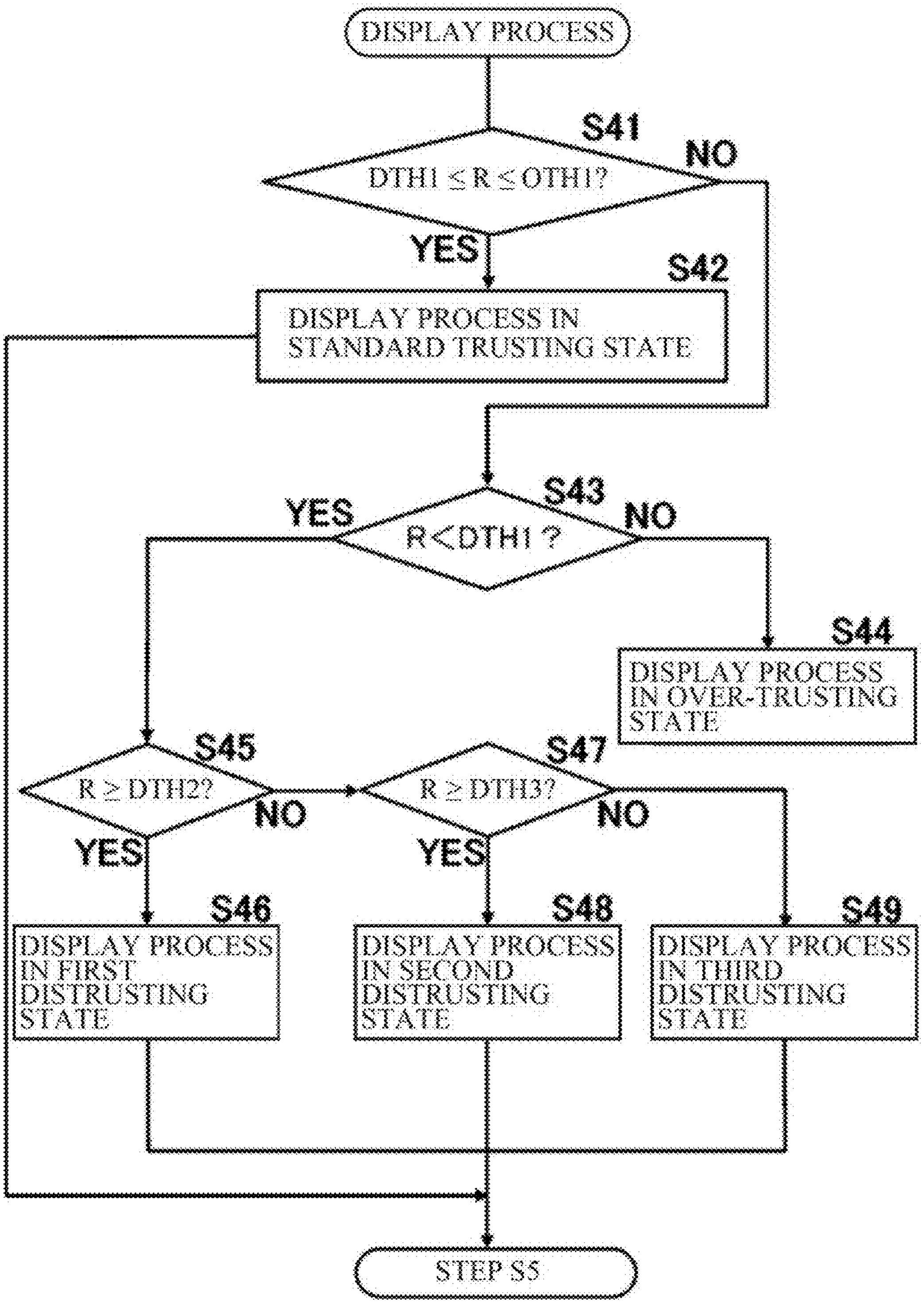

【 FIG. 6 】
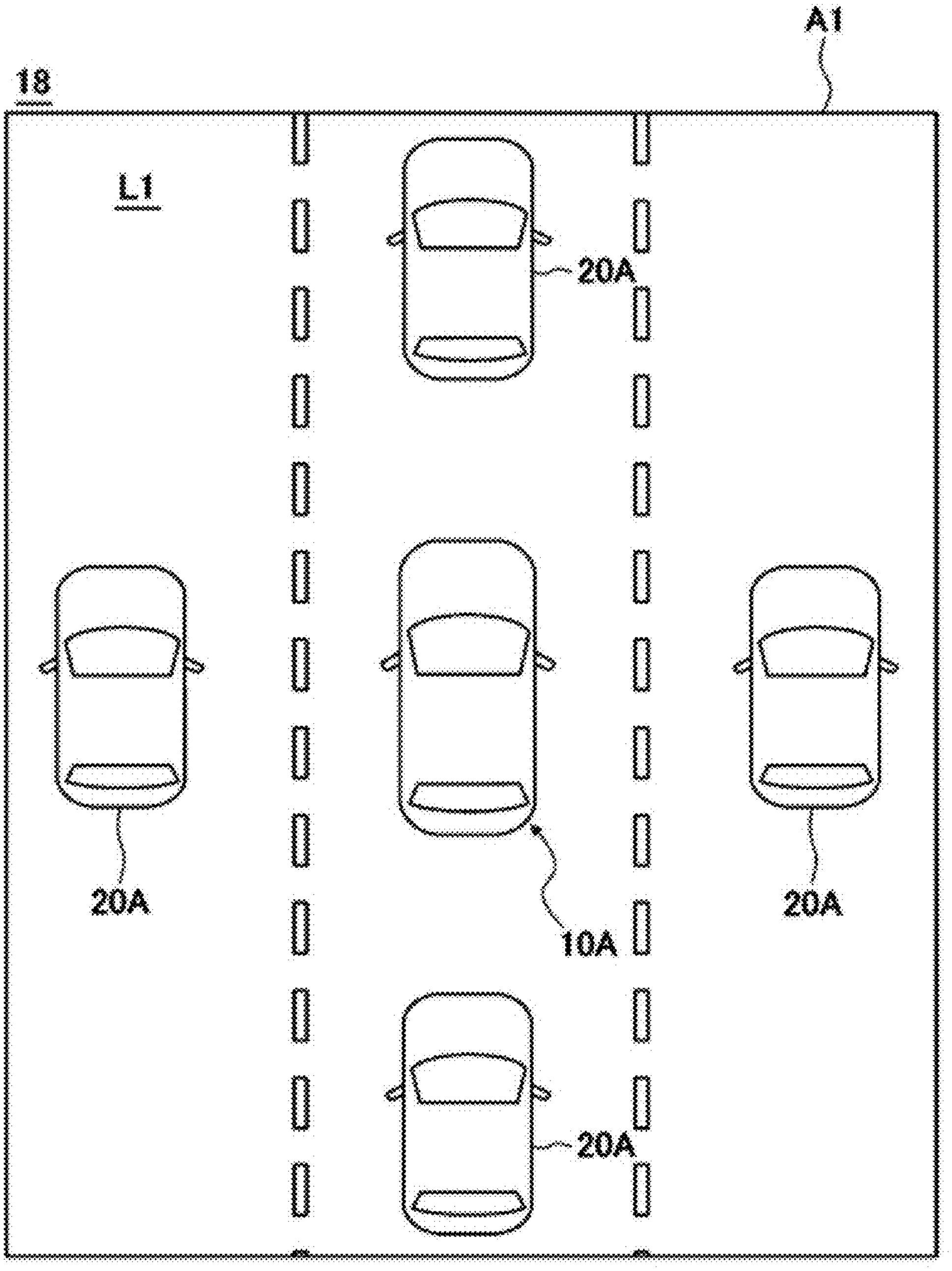

[ FIG. 7 ]
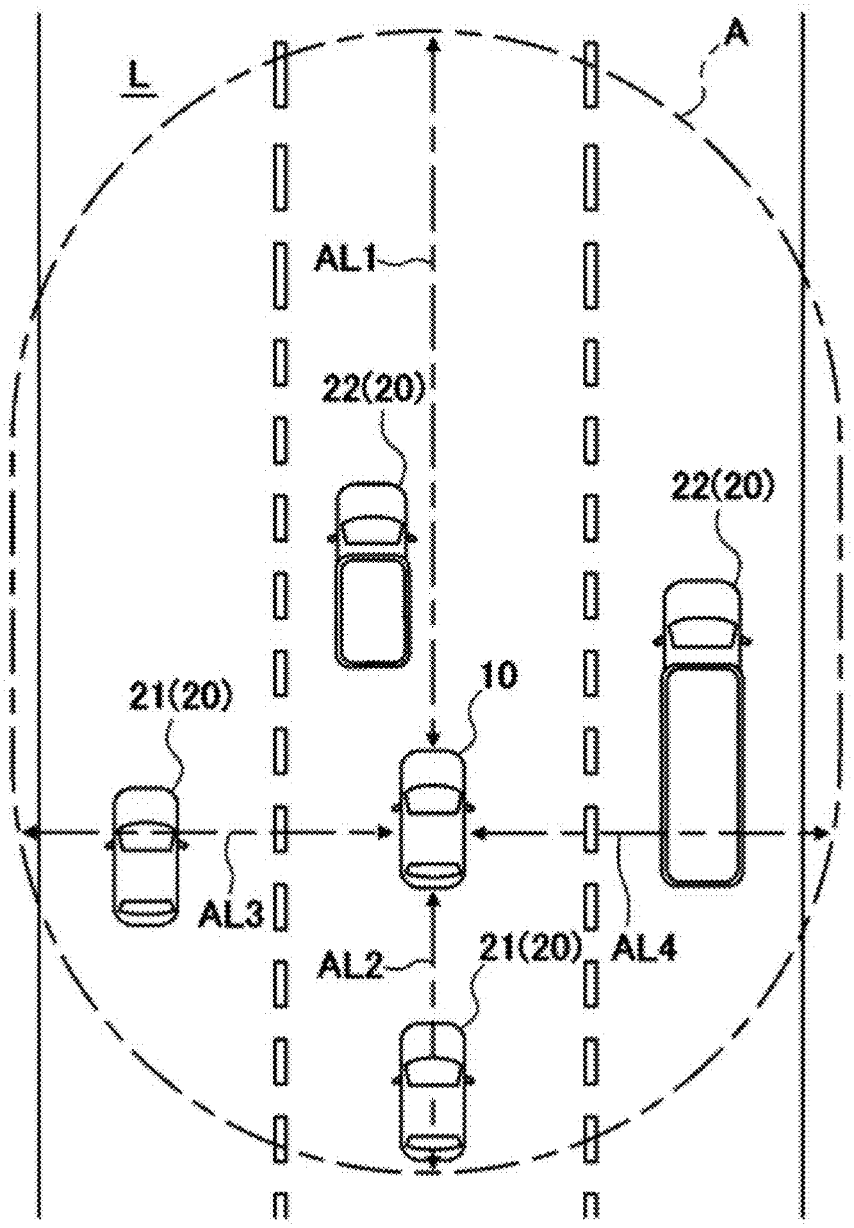

[ FIG. 8 ]
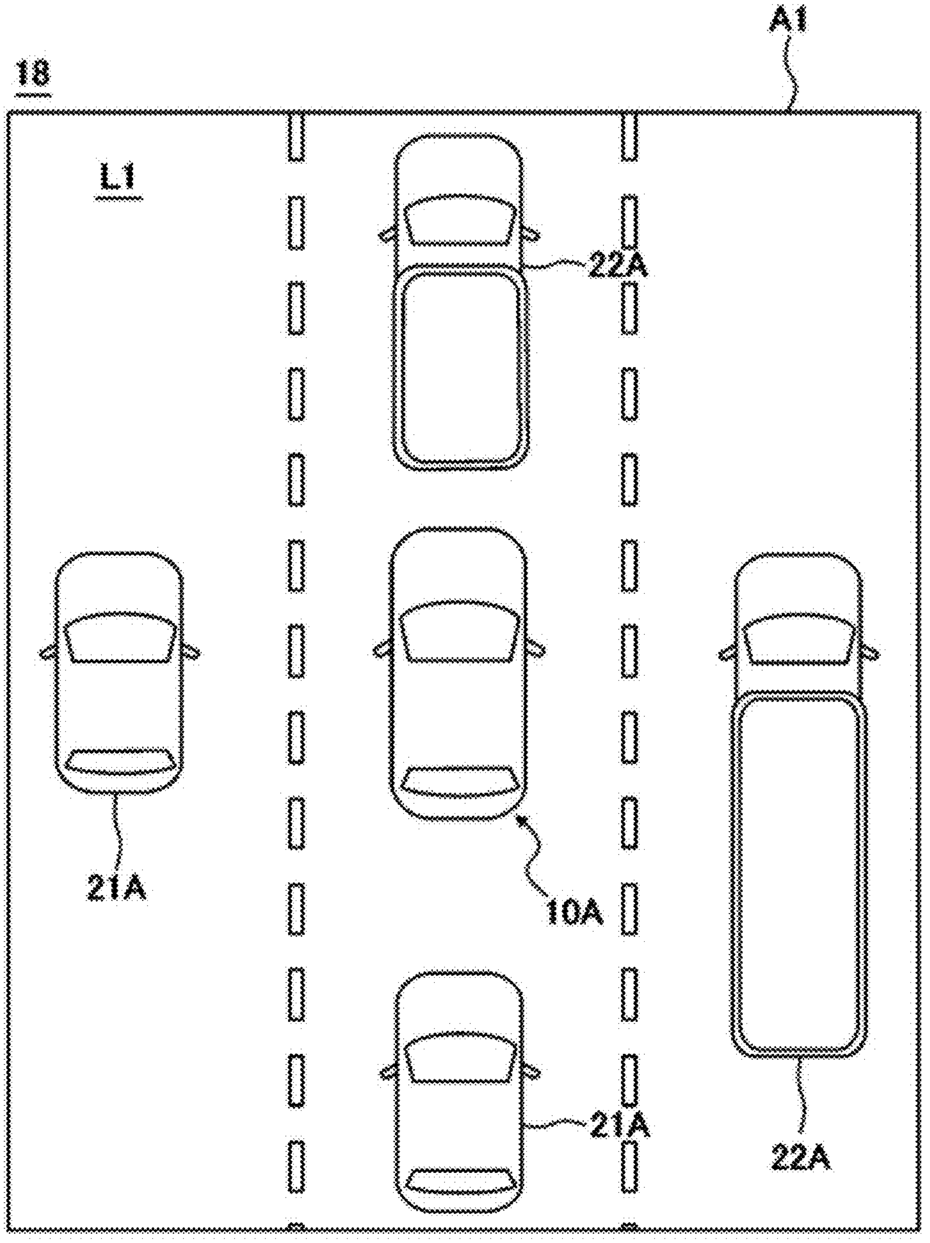

[ FIG. 9 ]
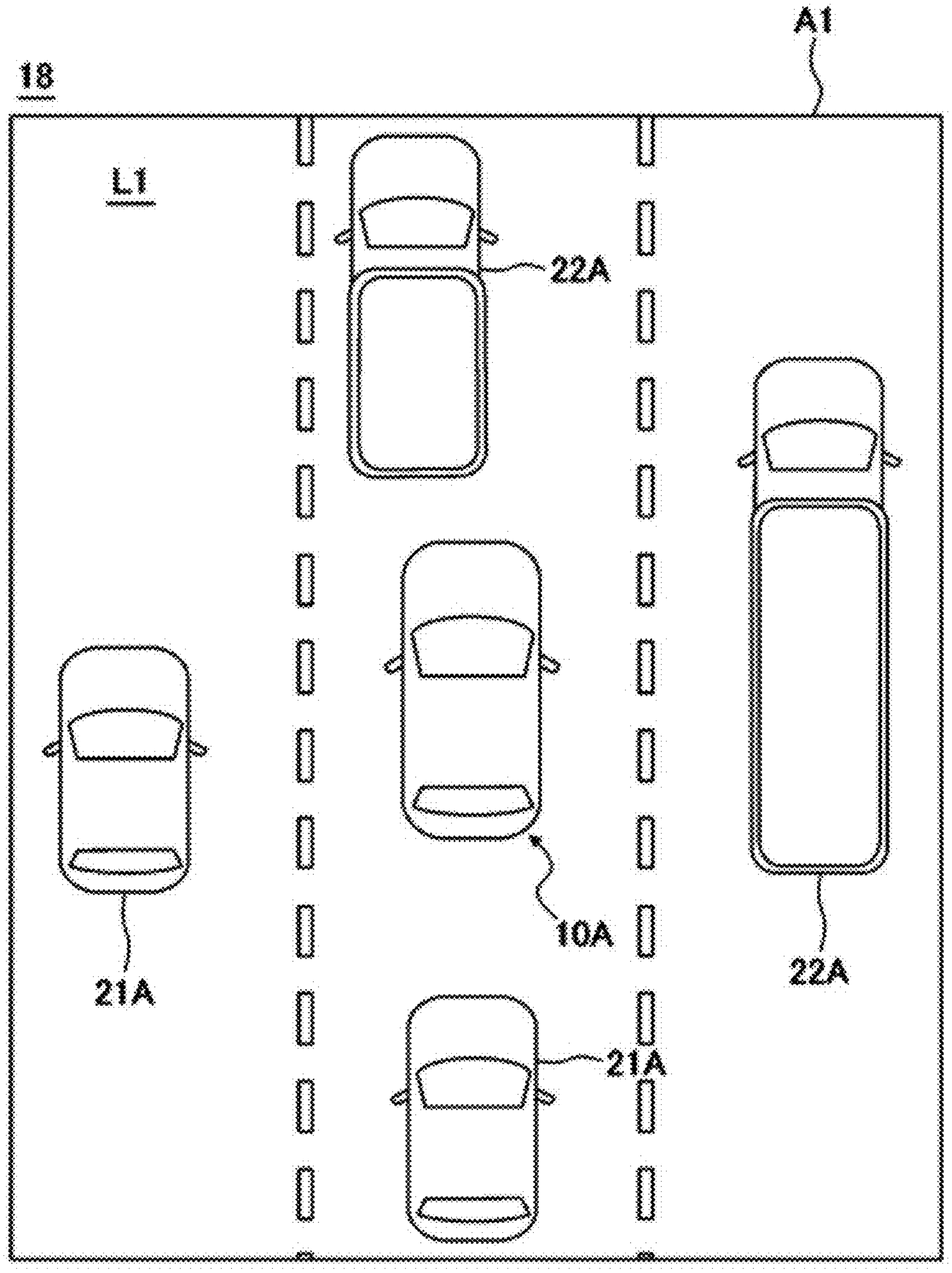

[ FIG. 10 ]
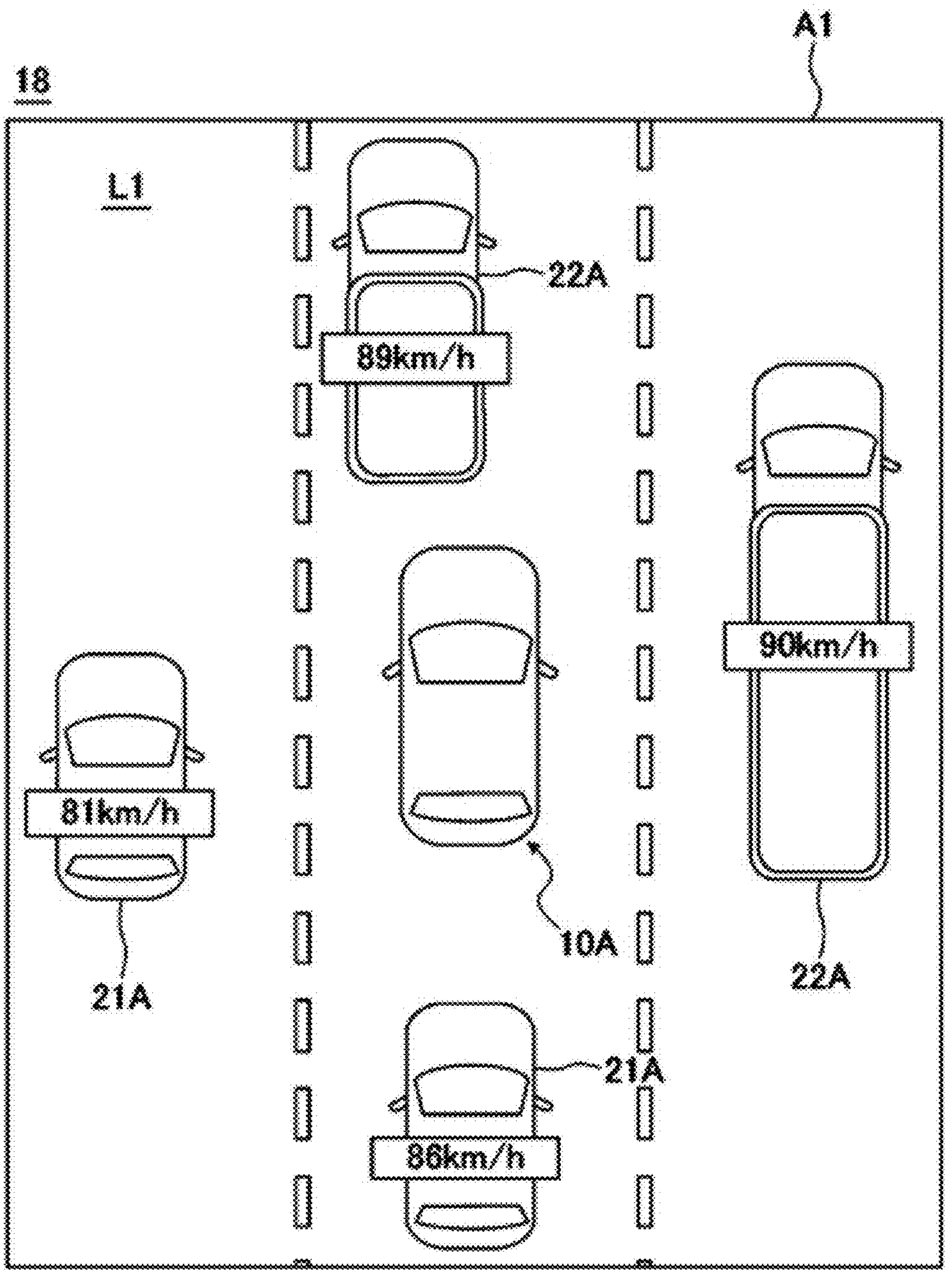

[ FIG. 11 ]
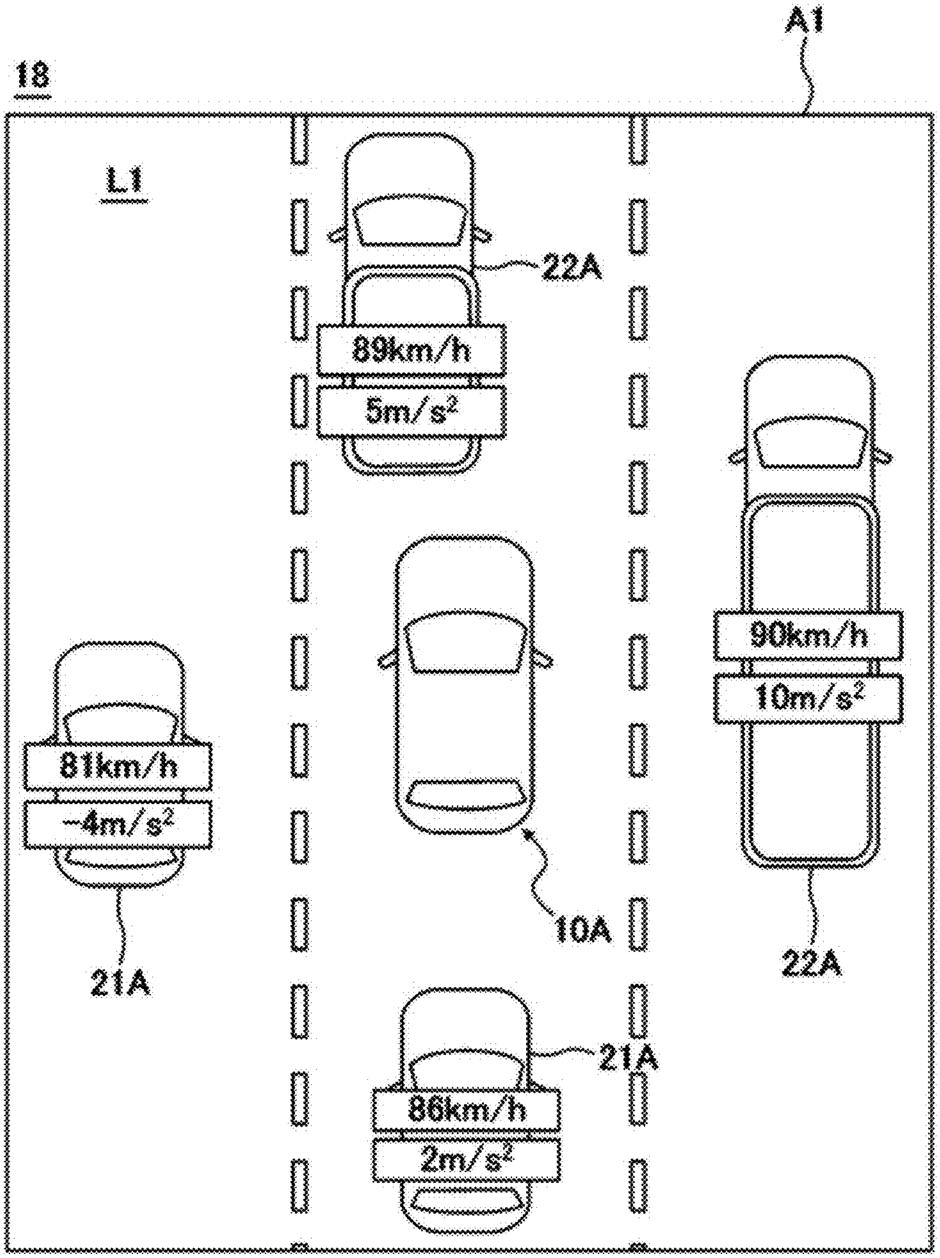

[ FIG. 12 ]
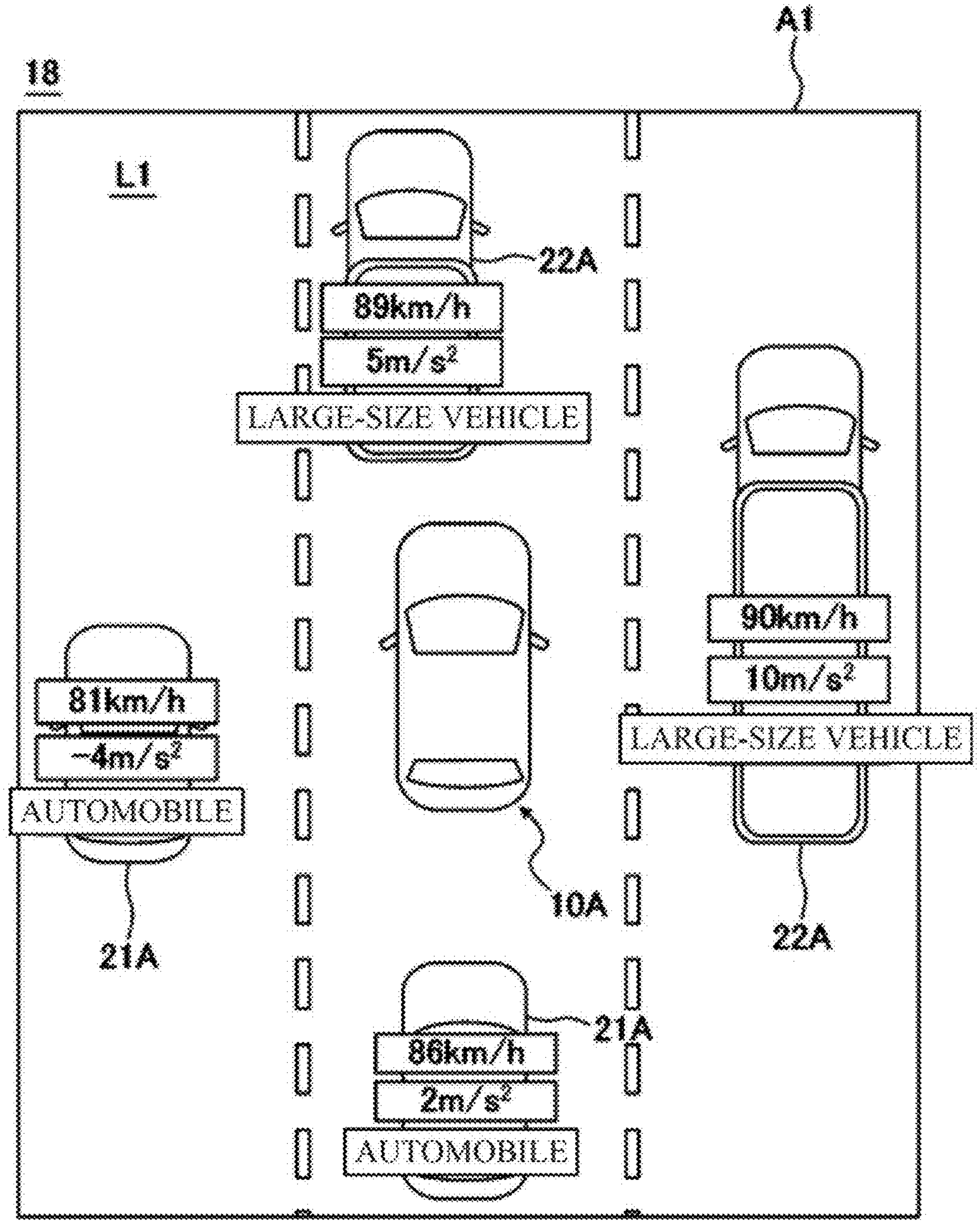

[ FIG. 13 ]
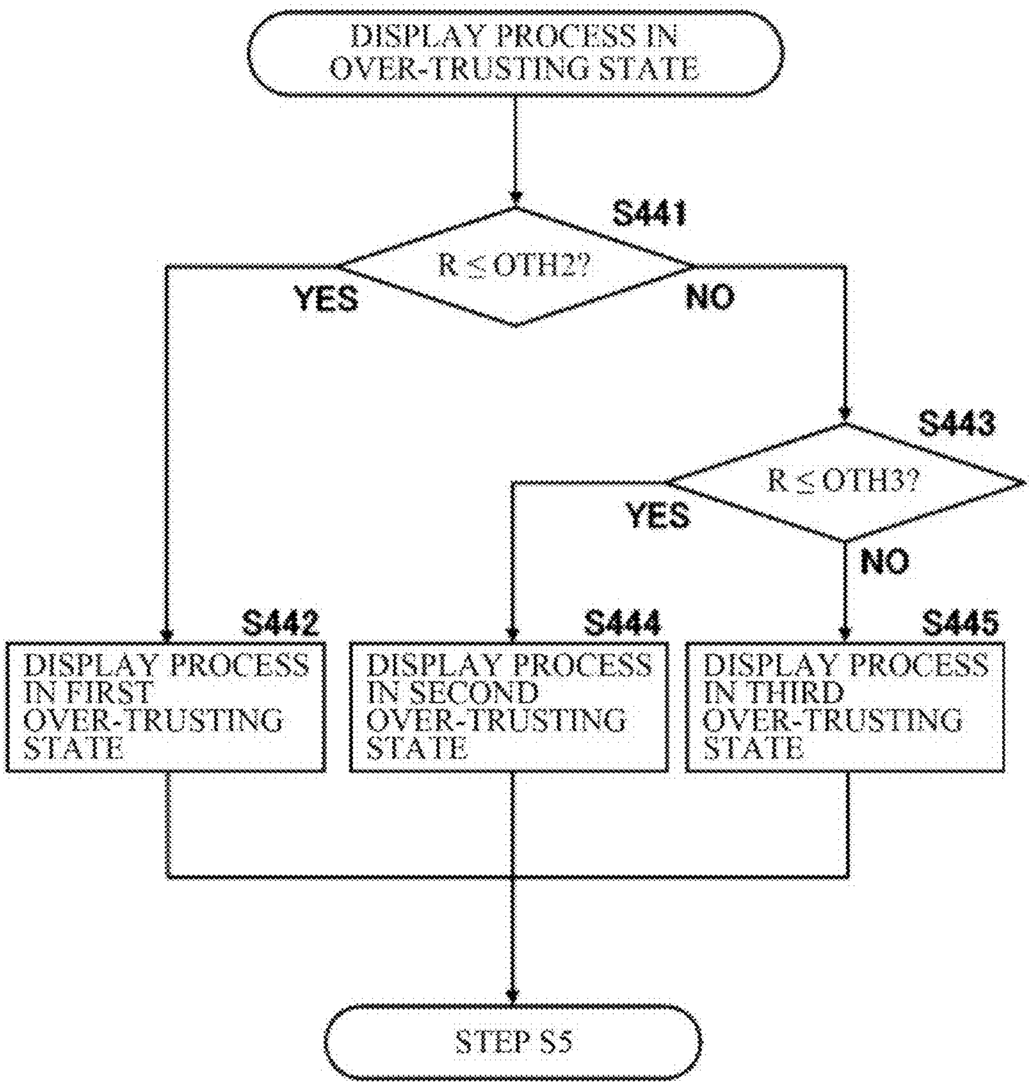

【 FIG. 14 】
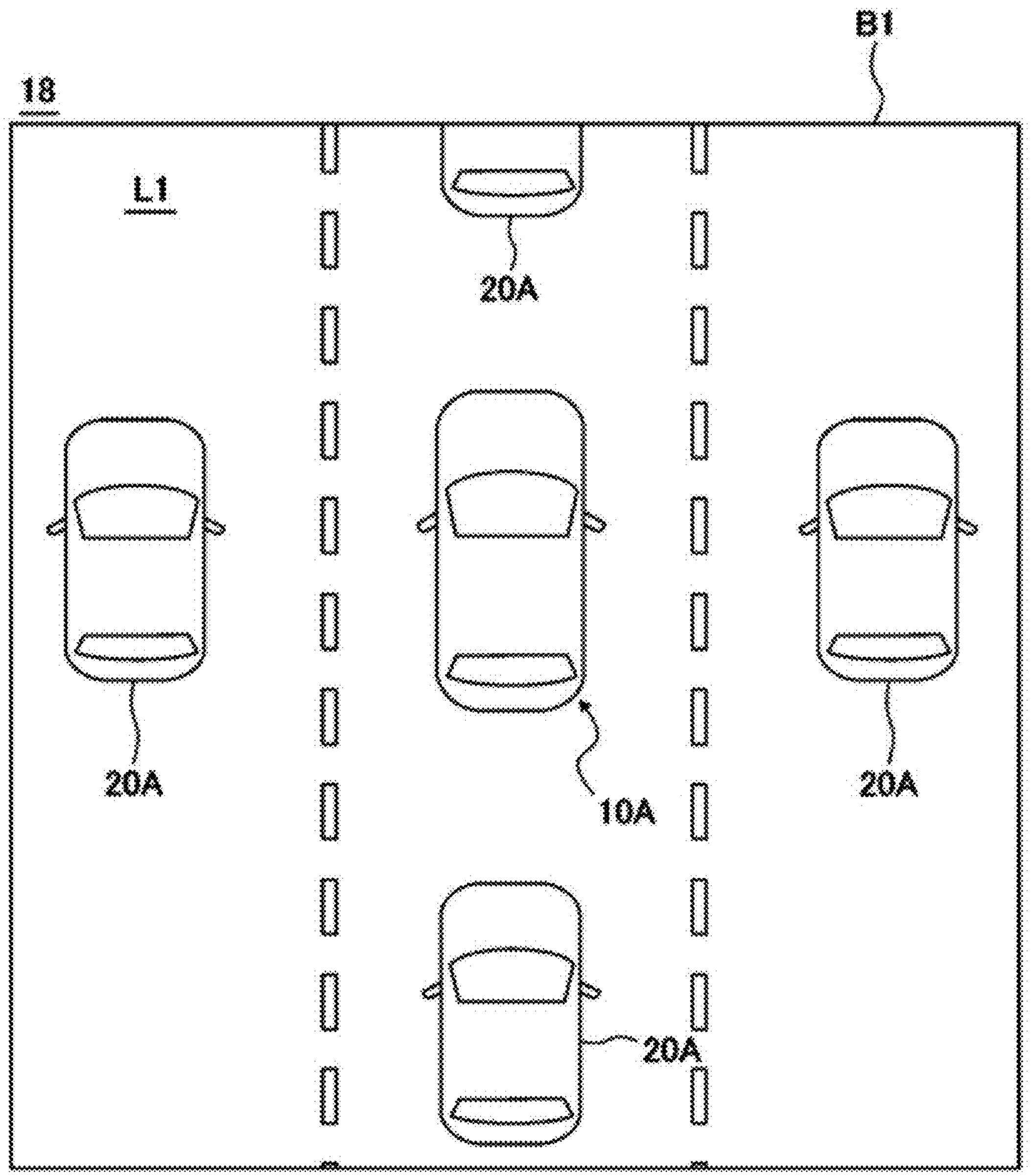

[ FIG. 15 ]
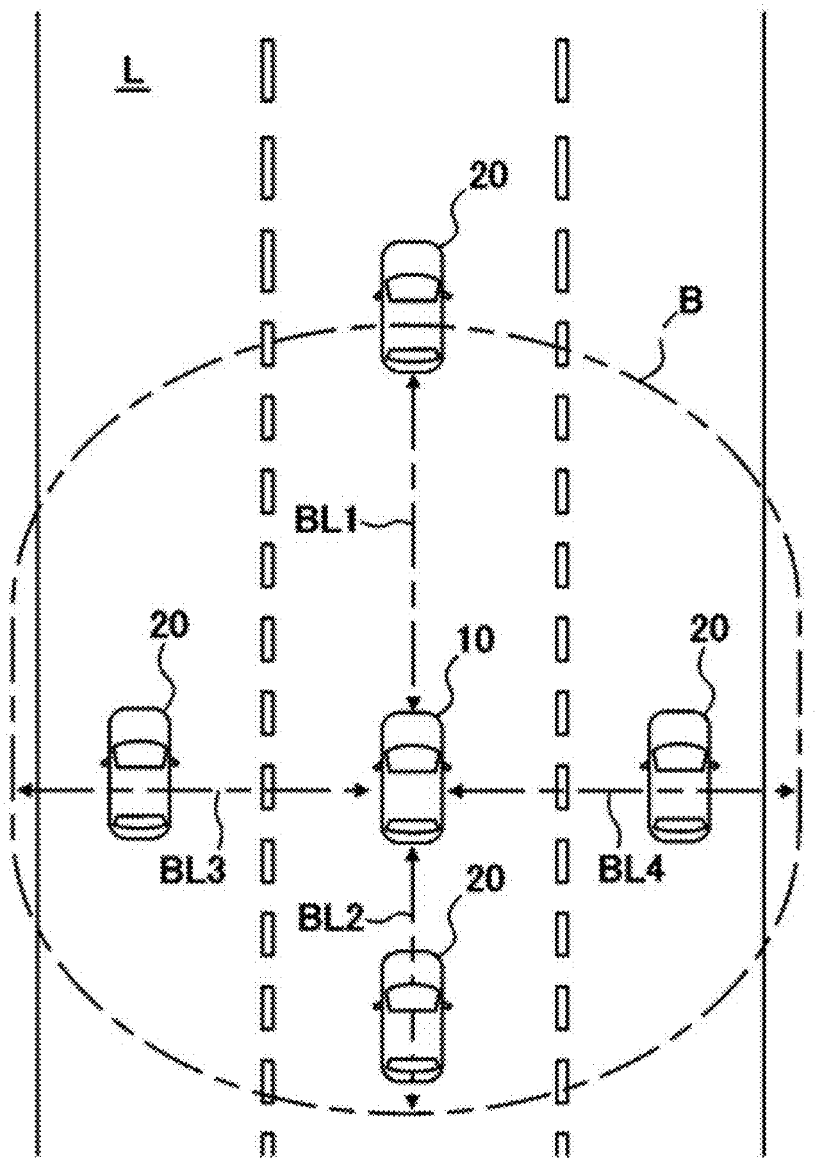

【 FIG. 16 】
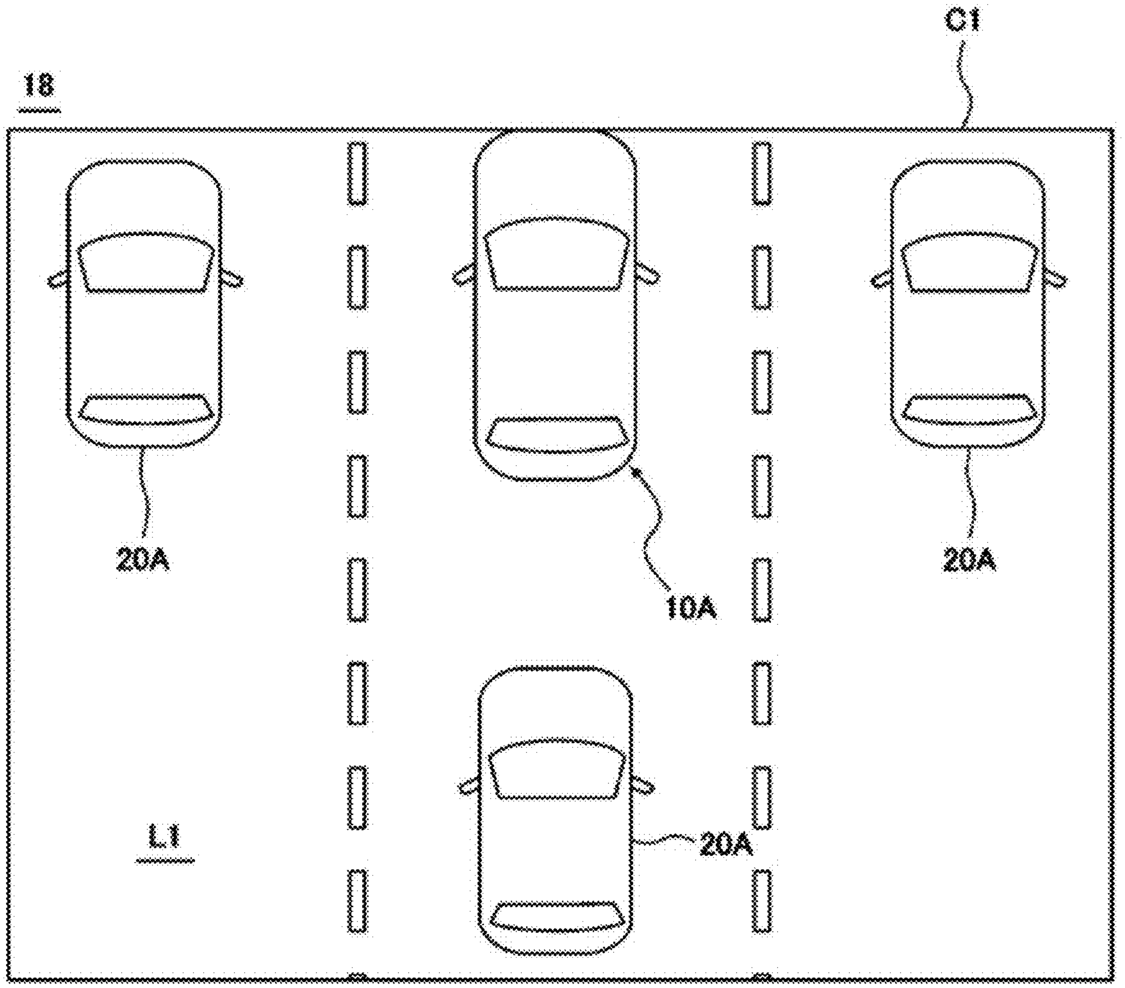

【 FIG. 17 】
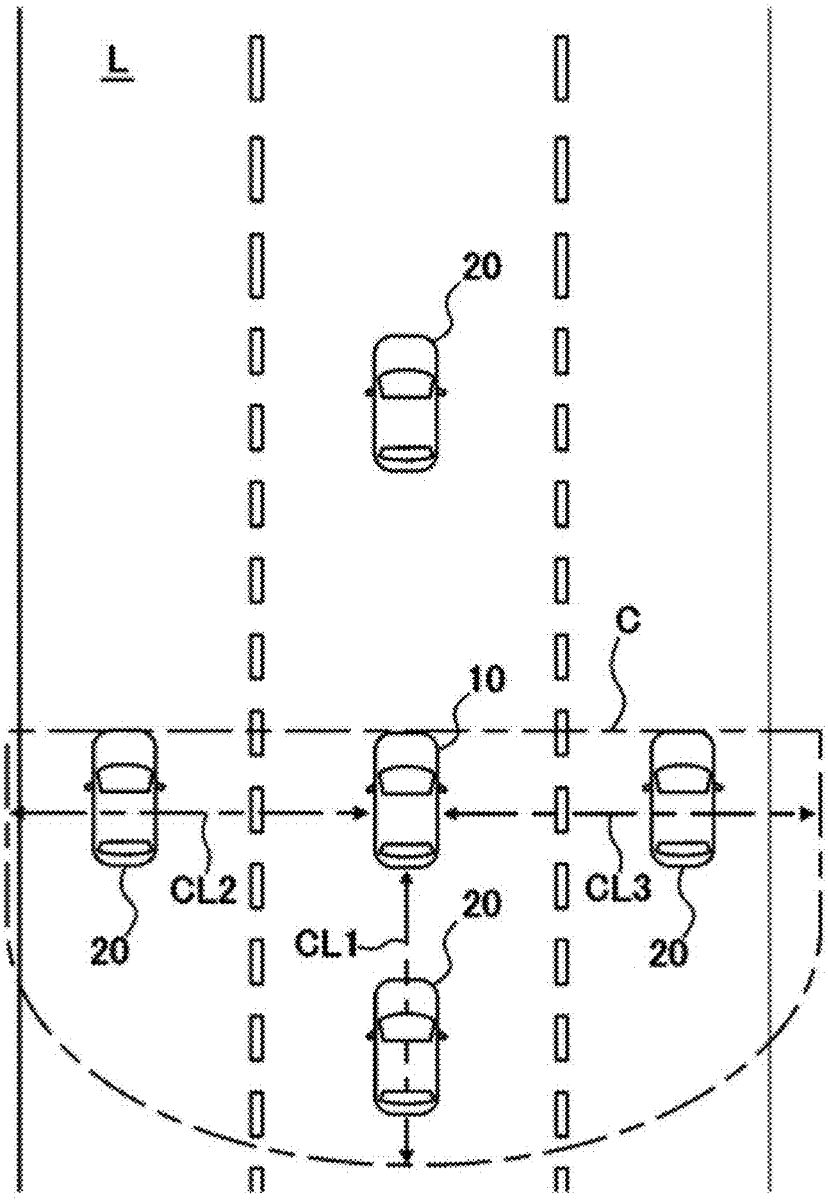

[ FIG. 18 ]
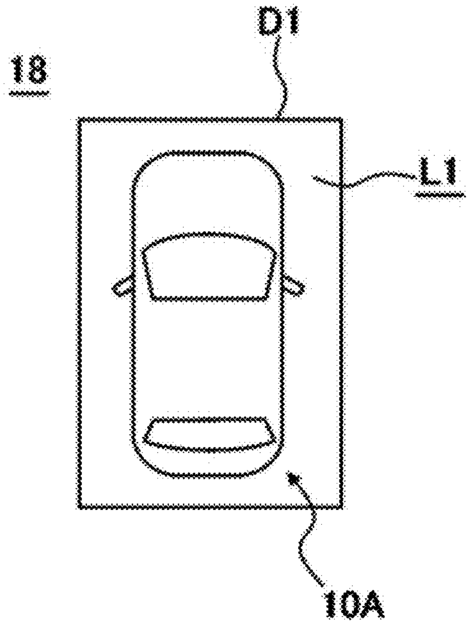

[ FIG. 19 ]
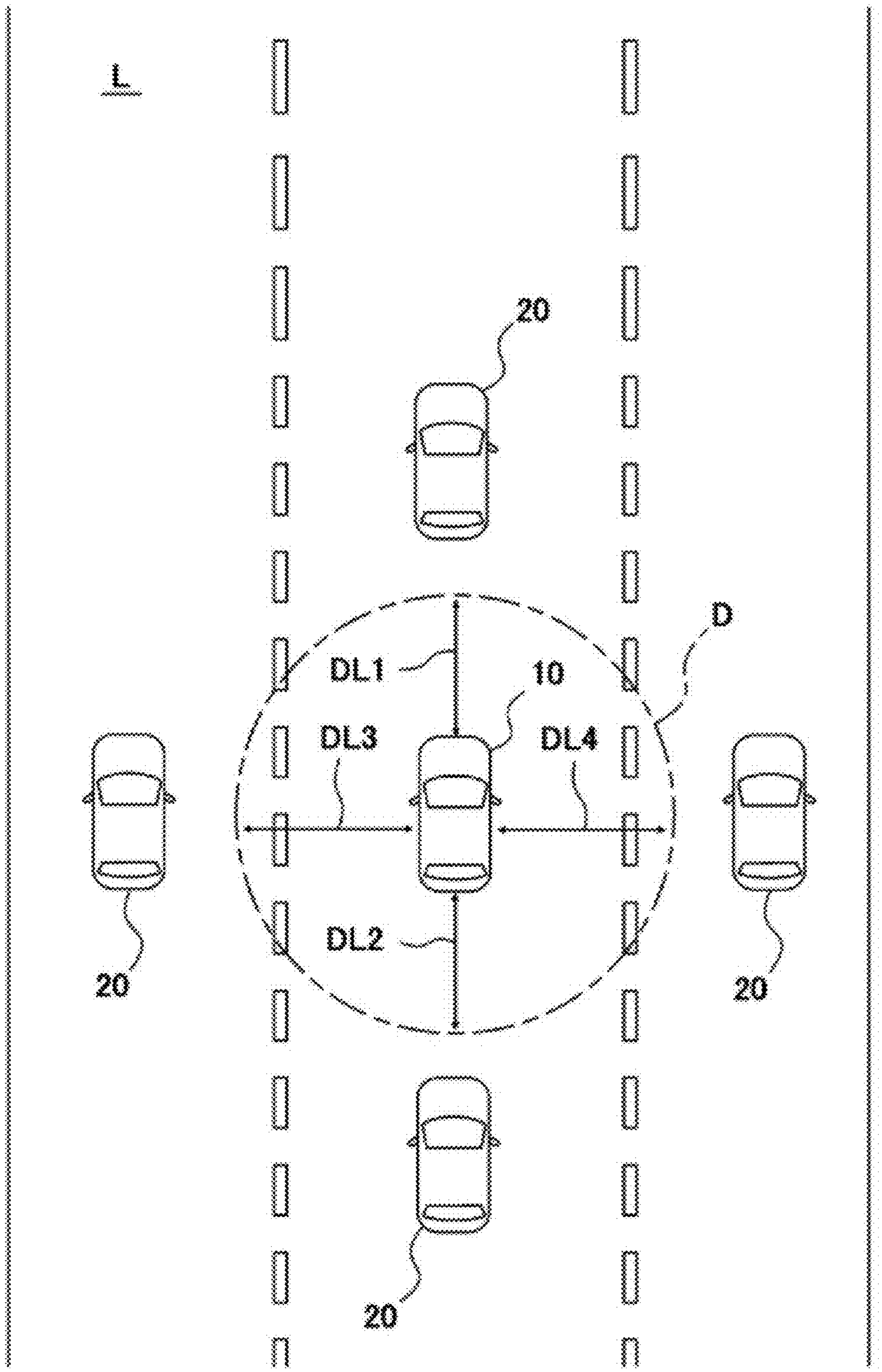

DRIVER ASSISTANCE APPARATUS, DRIVER ASSISTANCE METHOD, AND NON-TRANSITORY RECORDING MEDIUM

CROSS REFERENCE TO RELATED APPLICATIONS

This application is continuation of International Application No. PCT/JP2023/011473, filed on Mar. 23, 2023, the entire contents of which are hereby incorporated by reference.

BACKGROUND

The disclosure relates to a driver assistance apparatus, a driver assistance method, and a non-transitory recording medium.

Various kinds of driver assistance apparatuses that assist drivers in driving vehicles have been proposed. Nowadays, a technique is known of notifying a driver of the content of control during automated driving control. According to the technique, the content of control is notified to the driver who has a low level of trust in the automated driving, whereas the content of control is not notified to the driver who has a high level of trust in the automated driving.

SUMMARY

An aspect of the disclosure provides a driver assistance apparatus configured to assist a driver in driving a vehicle. The driver is a person who drives the vehicle. The driver assistance apparatus includes one or more processors, and one or more memories communicably coupled to the one or more processors. The one or more processors are configured to: acquire information on a surrounding environment of the vehicle; recognize the surrounding environment, based on the information on the surrounding environment; calculate a level of trust of the driver in the driver assistance apparatus; display at least recognition result information on a result of recognizing the surrounding environment; change, when the recognition result information is displayed, a number of information items indicating a display area around the vehicle or a state of a detection object present around the vehicle, in accordance with the level of trust; determine that the driver is in a standard trusting state with respect to the driver assistance apparatus when the level of trust thus calculated is less than or equal to a predetermined over-trust threshold based on which whether the driver is in an over-trusting state with respect to the driver assistance apparatus is determined and greater than or equal to a predetermined distrust threshold based on which whether the driver is in a distrusting state with respect to the driver assistance apparatus is determined; and set the display area to a first area when the driver is determined to be in the standard trusting state.

An aspect of the disclosure provides a driver assistance method of assisting a driver in driving a vehicle. The driver is a person who drives the vehicle. The driver assistance method includes: acquiring information on a surrounding environment of the vehicle; recognizing the surrounding environment, based on the information on the surrounding environment; calculating a level of trust of the driver in a driver assistance apparatus; displaying at least recognition result information on a result of recognizing the surrounding environment; changing, when the recognition result information is displayed, a number of information items indicating a display area around the vehicle or a state of a detection object present around the vehicle, in accordance with the level of trust; determining that the driver is in a standard trusting state with respect to the driver assistance apparatus when the level of trust thus calculated is less than or equal to a predetermined over-trust threshold based on which whether the driver is in an over-trusting state with respect to the driver assistance apparatus is determined and greater than or equal to a predetermined distrust threshold based on which whether the driver is in a distrusting state with respect to the driver assistance apparatus is determined; and setting the display area to a first area when the driver is determined to be in the standard trusting state.

An aspect of the disclosure provides a non-transitory computer readable recording medium containing a computer program to be applied to a driver assistance apparatus. The driver assistance apparatus is configured to assist a driver in driving a vehicle. The driver is a person who drives the vehicle. The computer program causes, when executed by one or more processors, the one or more processors to implement a method including: acquiring information on a surrounding environment of the vehicle; recognizing the surrounding environment, based on the information on the surrounding environment; calculating a level of trust of the driver in the driver assistance apparatus; displaying at least recognition result information on a result of recognizing the surrounding environment; changing, when the recognition result information is displayed, a number of information items indicating a display area around the vehicle or a state of a detection object present around the vehicle, in accordance with the level of trust; determining that the driver is in a standard trusting state with respect to the driver assistance apparatus when the level of trust thus calculated is less than or equal to a predetermined over-trust threshold based on which whether the driver is in an over-trusting state with respect to the driver assistance apparatus is determined and greater than or equal to a predetermined distrust threshold based on which whether the driver is in a distrusting state with respect to the driver assistance apparatus is determined; and setting the display area to a first area when the driver is determined to be in the standard trusting state.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 1 is a schematic diagram illustrating a configuration example of a vehicle according to one example embodiment of the disclosure.

FIG. 2 is a block diagram illustrating a configuration example of a driver assistance apparatus to be applied to the vehicle illustrated in FIG. 1.

FIG. 3 is a flowchart of a driver assistance method according to one example embodiment of the disclosure.

FIG. 4 is an explanatory diagram for facilitating the understanding of the driver assistance method illustrated in FIG. 3.

FIG. 5 is a flowchart of a display process in the driver assistance method illustrated in FIG. 3.

FIG. 6 is a diagram illustrating a display example to be displayed when a driver who drives the vehicle is in a standard trusting state with respect to the driver assistance apparatus illustrated in FIG. 2.

FIG. 7 is an explanatory diagram illustrating a first predetermined region of a measurement range of a surrounding environment recognizer of the vehicle illustrated in FIG. 1.

FIG. 8 is a diagram illustrating a display example to be displayed when the driver who drives the vehicle is in a first distrusting state with respect to the driver assistance apparatus illustrated in FIG. 2.

FIG. 9 is a diagram illustrating a display example to be displayed when the driver who drives the vehicle is in a second distrusting state with respect to the driver assistance apparatus illustrated in FIG. 2.

FIG. 10 is a diagram illustrating a display example to be displayed when the driver who drives the vehicle is in a third distrusting state with respect to the driver assistance apparatus illustrated in FIG. 2.

FIG. 11 is a diagram illustrating a display example to be displayed when the driver who drives the vehicle is in the third distrusting state with respect to the driver assistance apparatus illustrated in FIG. 2.

FIG. 12 is a diagram illustrating a display example to be displayed when the driver who drives the vehicle is in the third distrusting state with respect to the driver assistance apparatus illustrated in FIG. 2.

FIG. 13 is a flowchart of an exemplary display process when the driver who drives the vehicle is in an over-trusting state with respect to the driver assistance apparatus illustrated in FIG. 2.

FIG. 14 is a diagram illustrating a display example to be displayed when the driver who drives the vehicle is in a first over-trusting state with respect to the driver assistance apparatus illustrated in FIG. 2.

FIG. 15 is an explanatory diagram illustrating a second predetermined region of the measurement range of the surrounding environment recognizer of the vehicle illustrated in FIG. 1.

FIG. 16 is a diagram illustrating a display example to be displayed when the driver who drives the vehicle is in a second over-trusting state with respect to the driver assistance apparatus illustrated in FIG. 2.

FIG. 17 is an explanatory diagram illustrating a third predetermined region of the measurement range of the surrounding environment recognizer of the vehicle illustrated in FIG. 1.

FIG. 18 is a diagram illustrating a display example to be displayed when the driver who drives the vehicle is in a third over-trusting state with respect to the driver assistance apparatus illustrated in FIG. 2.

FIG. 19 is an explanatory diagram illustrating a fourth predetermined region of the measurement range of the surrounding environment recognizer of the vehicle illustrated in FIG. 1.

DETAILED DESCRIPTION

Various kinds of driver assistance apparatuses that assist drivers in driving vehicles have been provided. Nowadays, a technique is known of notifying a driver of the content of control during automated driving control. According to the technique, the content of control is notified to the driver who has a low level of trust in the automated driving, whereas the content of control is not notified to the driver who has a high level of trust in the automated driving.

According to an automated driving vehicle disclosed in Japanese Unexamined Patent Application Publication (JP-A) No. 2021-108073, for example, a driver who drives the vehicle is allowed to easily grasp a behavior of the vehicle in automated driving, and the frequency of outputting vehicle notification information to the outside of the vehicle is controlled in accordance with the level of trust of the driver in the automated driving. This reduces inconveniences to be caused by outputting the vehicle notification information. For example, the automated driving vehicle disclosed in JP-A No. 2021-108073 includes an outside-vehicle notifier, an in-vehicle notifier, a trust level estimator, and a notification processor. The outside-vehicle notifier outputs the vehicle notification information to the outside of the vehicle. The in-vehicle notifier notifies an occupant in the vehicle of predetermined information and outputs the vehicle notification information. The trust level estimator estimates the level of trust of the occupant in the automated driving of the vehicle. The notification processor causes the outside-vehicle notifier and the in-vehicle notifier to output the vehicle notification information substantially at the same time, and controls the frequency of outputting the vehicle notification information in accordance with the level of trust of the occupant in the automated driving.

According to the automated driving vehicle disclosed in JP-A No. 2021-108073, the driver is allowed to easily grasp the behavior of the vehicle in the automated driving, and the frequency of outputting the vehicle notification information to the outside of the vehicle is controlled in accordance with the level of trust in the automated driving. This reduces inconveniences to be caused by outputting the vehicle notification information. However, according to the automated driving vehicle disclosed in JP-A No. 2021-108073, the driver is not given an opportunity to improve an over-trusting state or a distrusting state with respect to the automated driving to an appropriate state. This can hinder the over-trusting state or the distrusting state with respect to the automated driving from improving to an appropriate state.

It is desirable to provide a driver assistance apparatus, a driver assistance method, and a non-transitory recording medium that each make it possible to improve the over-trusting state or the distrusting state of the driver with respect to the automated driving to an appropriate state.

1. Example Embodiment

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

[Configuration of Vehicle]

FIG. 1 schematically illustrates a configuration example of a vehicle 10. The vehicle 10 may be, for example, a two-wheel drive automobile or a four-wheel drive automobile that transmits driving torque to the front wheels and the rear wheels. In some embodiments, the vehicle 10 may be an electric automobile including a drive motor for the front wheels and another drive motor for the rear wheels. In some embodiments, the vehicle 10 may be an electric automobile including respective drive motors for the wheels.

When the vehicle 10 is an electric automobile or a hybrid electric automobile, the vehicle 10 may include a secondary battery and a motor. The secondary battery may hold electric power to be supplied to the motor that drives the vehicle 10. The motor may output driving power of the vehicle 10. The motor may also serve as a power generator that generates electric power with which the battery is to be charged upon deceleration of the vehicle 10. The vehicle 10 may further include additional components including a power generator such as a fuel battery.

The vehicle 10 may include a driving power source 17, an electric steering device 15, braking devices 13A to 13D, and a vehicle processor 23 that are used for driving control of the vehicle 10. Hereinafter, the braking devices 13A to 13D are also simply and collectively referred to as "braking devices 13" when these braking devices are not to be distinguished from one another.

The driving power source 17 may generate driving torque and transmit the generated driving torque to a left-front wheel and a right-front wheel. The driving torque outputted from the driving power source 17 may be transmitted to a front-wheel driving shaft F via an unillustrated transmission and a differential mechanism 14. Driving of the driving power source 17 and driving of the transmission may be controlled by the vehicle processor 23.

The driving power source 17 may be an internal combustion engine such as a gasoline engine or a diesel engine. In some embodiments, the driving power source 17 may be a drive motor. In some embodiments, the vehicle 10 may include both of an internal combustion engine and a drive motor as the driving power sources 17.

As illustrated in FIG. 1, the electric steering device 15 may be disposed on the front-wheel driving shaft F. The electric steering device 15 may include an unillustrated electric motor and a gear mechanism, and may adjust steering angles of the front wheels under the control by the vehicle processor 23.

Each of the braking devices 13A to 13D may apply a braking force to a corresponding one of the wheels. In some embodiments, the braking devices 13 may be hydraulic braking devices, for example.

The vehicle processor 23 may include one or more electronic control units (ECUs). The one or more ECUs may control driving of the driving power source 17, driving of the electric steering device 15, and driving of a hydraulic unit 24. When the vehicle 10 includes a transmission that changes the output received from the driving power source 17 and transmits the changed output to the wheels, the vehicle processor 23 may control driving of the transmission.

The vehicle processor 23 may adjust hydraulic pressure to be supplied to each of the braking devices 13 by controlling driving of the hydraulic unit 24. When the vehicle 10 is an electric automobile or a hybrid electric automobile, the braking devices 13 may be used in combination with regeneration braking generated by a drive motor.

The vehicle processor 23 may be configured to acquire information transmitted from the driver assistance apparatus 11. The vehicle processor 23 may control respective control target devices, based on information received from an automated driving processor 112D as will be described later. The vehicle processor 23 may be configured to automatically control all or a part of traveling control of the vehicle 10 independent from driver's operations.

During manual driving, the vehicle processor 23 may control the electric steering device 15, based on a steering angle of a steering wheel 16 operated by a driver who drives the vehicle 10. During the manual driving, the vehicle processor 23 may control driving of the driving power source 17 and driving of the hydraulic unit 24, based on the amount of driver's operation on an accelerator pedal or a brake pedal.

The vehicle 10 may further include a surrounding environment recognizer 12, a vehicle position detection sensor 33, and a display 18. The surrounding environment recognizer 12 may include front imaging cameras 12A and 12B and a rear imaging camera 12C.

The front imaging cameras 12A and 12B and the rear imaging camera 12C acquires information on a surrounding environment of the vehicle 10. The front imaging cameras 12A and 12B may each capture an image of a frontal area ahead of the vehicle 10 in a traveling direction and generate image data. The rear imaging camera 12C may capture an image of a rear area behind the vehicle 10 in the traveling direction and generate image data.

The front imaging cameras 12A and 12B and the rear imaging camera 12C may each include an imaging device such as a charged coupled device (CCD) or a complementary metal oxide semiconductor (CMOS) and transmit the generated image data to the driver assistance apparatus 11. In the vehicle 10 illustrated in FIG. 1, the front imaging cameras 12A and 12B may serve as right and left cameras paired into a stereo camera. In some embodiments, the front imaging cameras 12A and 12B may be monocular cameras.

In some embodiments, the surrounding environment recognizer 12 may include unillustrated cameras disposed on respective side mirrors of the vehicle 10, in addition to the front imaging cameras 12A and 12B and the rear imaging camera 12C. Alternatively, or in addition thereto, the surrounding environment recognizer 12 may include one or more of a light detection and ranging (LiDAR) sensor, a millimeter-wave radar, and an ultrasonic sensor.

The vehicle position detection sensor 33 may receive satellite signals from positioning satellites of a global navigation satellite system (GNSS) such as the global positioning system (GPS) or any other system having positioning functionality. The vehicle position detection sensor 33 may detect a current position of the vehicle 10 in a predetermined operation cycle, based on the received satellite signals, and may transmit data on the detected current position of the vehicle 10 to the driver assistance apparatus 11. The data on the current position of the vehicle 10 may be indicated by a latitude and a longitude. In some embodiments, the vehicle position detection sensor 33 may include an antenna that receives satellites signals from a satellite system, other than the GPS, which identifies the position of the vehicle 10, in addition to or in place of the GPS sensor.

In some embodiments, the driver assistance apparatus 11 may generate data indicating a moving direction of the vehicle 10 and data indicating a moving speed of the vehicle 10, based on the data on the position of the vehicle 10 received from the vehicle position detection sensor 33. The driver assistance apparatus 11 may calculate the moving speed of the vehicle 10, based on, for example, a change in position of the vehicle 10. In some embodiments, the driver assistance apparatus 11 may calculate the moving speed of the vehicle 10 by dividing a distance from the position of the vehicle 10 obtained in a previous operation cycle to the position of the vehicle 10 obtained in a current operation cycle by a unit time corresponding to the operation cycle. In some embodiments, the driver assistance apparatus 11 may calculate the moving direction of the vehicle 10 as a direction in which the position of the vehicle 10 is to change.

The display 18 may be driven by the driver assistance apparatus 11 to display various kinds of information visually recognizable by the driver. The display 18 according to the example embodiment may be disposed in an instrument panel; however, the display 18 is not limited thereto. In some embodiments, the display 18 may be a display of a navigation system. In some embodiments, the display 19 may be another display different from the one described in the example embodiment.

The driver assistance apparatus 11 assists the driver in driving the vehicle 10 when a computer program is executed by one or more processors such as central processing units (CPUs). The computer program causes the one or more processors to implement processing such as a driver assistance method according to an example embodiment of the disclosure. In some embodiments, the computer program to be executed by the one or more processors may be held in a recording medium serving as a memory 113 provided in the driver assistance apparatus 11. In some embodiments the computer program may be held in a recording medium incorporated in the driver assistance apparatus 11. In some embodiments, the computer program may be held in any recording medium externally attachable to the driver assistance apparatus 11. In some embodiments, one or more memories 113 may be provided.

Non-limiting examples of the recording medium holding the computer program may include: a magnetic medium such as a hard disk, a floppy disk, or a magnetic tape; an optical recording medium such as a CD-ROM, a DVD, or a Blu-ray (registered trademark); a magneto-optical medium such as a floptical disk; a memory such as a random access memory (RAM) or a read only memory (ROM); a flash memory such as a universal serial bus (USB) memory or a solid state drive (SSD); and another medium configured to hold programs.

<Operational Configuration of Driver Assistance Apparatus>

FIG. 2 is a block diagram illustrating a configuration example of the driver assistance apparatus 11. The surrounding environment recognizer 12, the vehicle processor 23, the vehicle position detection sensor 33, and the display 18 may be coupled to the driver assistance apparatus 11 via a dedicated line or a communication network such as a controller area network (CAN) or a local interconnect network (LIN). Note that the driver assistance apparatus 11 is not limited to an ECU mounted in the vehicle 10. In some embodiments, the driver assistance apparatus 11 may be a terminal device such as a touch pad or a wearable device.

The driver assistance apparatus 11 may include a vehicle-to-vehicle communicator 111, a processing unit 112, and the memory 113. The processing unit 112 may include one or more processors such as CPUs and various peripheral components. In some embodiments, all or a part of the processing unit 112 may be updatable software such as firmware or a program module to be executed in response to a command from the CPUs.

(Vehicle-to-Vehicle Communicator)

The vehicle-to-vehicle communicator 111 may be an interface that communicates with another vehicle present in a predetermined distance from the vehicle 10. The driver assistance apparatus 11 may send and receive information to/from the other vehicle different from the vehicle 10 via the vehicle-to-vehicle communicator 111.

(Memory)

The memory 113 may be a recording medium communicably coupled to the processing unit 112 and include one or more RAMs, ROMs, hard disk drives (HDDs), compact discs (CDs), digital versatile discs (DVDs), SSDs, USB flashes, or other storage devices. Note that the memory 113 is not particularly limited in kind or number. The memory 113 may hold computer programs to be executed by the processing unit 112, various parameters to be used for calculation processing, detection data, and data on results of the calculation processing. A part of the memory 113 may be used as a work area of the processing unit 112.

The memory 113 according to the example embodiment may hold data on patterns of feature point groups associated with various kinds of objects. The data may be used for pattern matching as will be described later. The term "object" as used herein may refer to, for example, a mobile body, a static object, or a boundary line on a traveling lane. Non-limiting examples of the mobile body may include vehicles such as automobiles and trucks, bicycles, and pedestrians. Non-limiting examples of the static object may include guardrails, curbstones, roads, and buildings.

(Processing Unit)

The processing unit 112 may include a surrounding environment information obtainer 112A, a vehicle-to-vehicle communication processor 112B, a surrounding environment recognition processor 112C, an automated driving processor 112D, a trust level calculator 112E, and a display processor 112F. Functionality of these processors may be implemented when the computer programs are executed by the processors. In some embodiments, all or a part of the surrounding environment information obtainer 112A, the vehicle-to-vehicle communication processor 112B, the surrounding environment recognition processor 112C, the automated driving processor 112D, the trust level calculator 112E, and the display processor 112F may be hardware such as analog circuitry.

The surrounding environment information obtainer 112A may acquire information on the surrounding environment of the vehicle 10. The information on the surrounding environment of the vehicle 10 may indicate, for example, results of measurement by the surrounding environment recognizer 12.

The vehicle-to-vehicle communication processor 112B may communicate with another vehicle present in a predetermined distance from the vehicle 10 to acquire information on the other vehicle. The information may include data on a kind, a position, and a moving speed of the other vehicle.

The surrounding environment recognition processor 112C may execute a surrounding environment recognition process of recognizing the surrounding environment of the vehicle 10, based on the information on the surrounding environment acquired from the surrounding environment recognizer 12 mounted in the vehicle 10. The surrounding environment recognition processor 112C may recognize a mobile body and a static object present around the vehicle 10 in the surrounding environment recognition process. The process to be performed by the surrounding environment recognition processor 112C will be described in detail later.

The automated driving processor 112D may perform automated driving control of the vehicle 10. The term "automated driving control" as used herein may refer not only to fully automated driving control in which all driving operations are performed by a computer in limited areas or regardless of areas, but also to driver assistance control in which one or more of acceleration operation, braking operation, and steering operation are partially performed by a computer when the driver drives the vehicle 10.

In some embodiments, the automated driving processor 112D may generate one or more pieces of data on target values of a steering angle, a vehicle speed, an acceleration rate, and a braking force, and transmit the data to the vehicle processor 23 to cause the vehicle 10 to travel along a traveling route avoiding an obstacle such as another vehicle or a pedestrian.

The trust level calculator 112E may calculate a level of trust of the driver in the automated driving performed by the automated driving processor 112D or in the functionality of assisting driving operation (hereinafter referred to as automated driving control functionality) of the automated driving processor 112D. The trust level calculator 112E may calculate the level of trust according to various kinds of methods without limitation. In some embodiments, the trust level calculator 112E may calculate the level of trust, based on the frequency of use of the automated driving control functionality of the automated driving processor 112D by an individual driver who drives the vehicle 10. In some embodiments, the trust level calculator 112E may calculate the level of trust, based on the frequency of driving operation performed by the individual driver against an operation command from the automated driving processor 112D during activation of the automated driving control functionality. In some embodiments, the trust level calculator 112E may calculate the level of trust, based on information on answers of the individual driver to a questionnaire about the automated driving control functionality.

The display processor 112F may cause the display 18 to display information on a result of recognition in the surrounding environment recognition process (hereinafter simply referred to as recognition result information) as information visually recognizable by the driver who drives the vehicle 10. Further, the display processor 112F may cause the display 18 to display, in addition to the recognition result information, information on a state of the object recognized around the vehicle 10 in the surrounding environment recognition process (hereinafter simply referred to as detection object information) as information visually recognizable by the driver who drives the vehicle 10.

[Driver Assistance Method]

FIG. 3 is a flowchart of the driver assistance method according to an example embodiment of the disclosure. In the following, an example of the driver assistance method according to the example embodiment of the disclosure is described with reference to FIG. 3. Note that the flowchart may be repeatedly executed in a predetermined operation cycle in a state where the functionality according to the example embodiment of the disclosure is activated.

<Step S1: Acquiring Surround Environment Information of Vehicle>

When the processing unit 112 of the driver assistance apparatus 11 detects the activation of driver assistance functionality, the surrounding environment information obtainer 112A may acquire the information on the surrounding environment of the vehicle 10 in Step S1. In some embodiments, the surrounding environment information obtainer 112A may acquire image data from the surrounding environment recognizer 12 (i.e., the front imaging cameras 12A and 12B and the rear imaging camera 12C).

<Step S2: Surrounding Environment Recognition Process>

Thereafter, in Step S2, the surrounding environment recognition processor 112C may perform the surrounding environment recognition process of recognizing the surrounding environment of the vehicle 10, based on the information on the surrounding environment acquired from the surrounding environment information obtainer 112A. In some embodiments, the surrounding environment recognition processor 112C may perform an edge detection process of extracting feature points from the image data acquired from the surrounding environment recognizer 12, and perform pattern matching between the extracted feature points and the feature point groups of various kinds of objects recorded in advance. The surrounding environment recognition processor 112C may thereby recognize a detection object present around the vehicle 10, identify a kind of the detection object, and identify a position of the detection object in a real space.

In some embodiments, the surrounding environment recognition processor 112C may recognize the detection object present around the vehicle 10 and identify the kind of the detection object by matching the extracted feature point groups with the data on the feature point groups indicating: a mobile body such as a vehicle, a bicycle, or a pedestrian; a static object such as a guardrail, a curbstone, a road, and a building; and a boundary line of a traveling lane. Further, the surrounding environment recognition processor 112C may identify the position of the detection object in the real space, based on a position of the detection object in a measurement range and a distance to the detection object.

Thereafter, the surrounding environment recognition processor 112C may calculate a moving speed of the detection object thus recognized in the real space. In some embodiments, the surrounding environment recognition processor 112C may calculate the moving speed of the detection object in the real space, based on a temporal change in position of the detection object determined based on measurement data acquired in a current operation cycle and measurement data acquired in a previous operation cycle.

Note that the surrounding environment recognition process in Step S2 may be performed according to any known technique without limitation. When one of the components of the surrounding environment recognizer 12 is a LiDAR sensor, for example, the measurement data may include data on a speed at a measurement point. In this case, the process of calculating the moving speed by the surrounding environment recognition processor 112C may be omitted.

Thereafter, the surrounding environment recognition processor 112C may cause the memory 113 to store the data on the kind of the detection object thus identified and the data on the position thus identified as the recognition result information. Further, the surrounding environment recognition processor 112C may cause the memory 113 to store the data on the moving speed thus calculated as the detection object information. In other words, the recognition result information may include the data on the kind of the detection object and the data on the position of the detection object, and the detection object information may include the data on the moving speed of the detection object. Note that the term "position of the detection object" as used herein may refer to a relative position of the detection object with respect to the vehicle 10 in the real space, for example.

<Step S3: Calculating Level of Trust R>

Thereafter, in Step S3, the trust level calculator 112E may calculate a level of trust R of the driver who drives the vehicle 10 in the automated driving control functionality. The level of trust R may be calculated according to any known calculation method without limitation. In some embodiments, the trust level calculator 112E may calculate the level of trust R in the automated driving control functionality, based on information recorded during the driving of the vehicle 10 by the driver or during the use of the vehicle 10 by the driver.

In some embodiments, the trust level calculator 112E may calculate the level of trust R, based on the frequency of use of the automated driving control functionality of the automated driving processor 112D by the individual driver who drives the vehicle 10. In some embodiments, the trust level calculator 112E may calculate the level of trust R, based on the frequency of driving operation performed by the individual driver against the operation command from the automated driving processor 112D during the activation of the automated driving control functionality. In some embodiments, the trust level calculator 112E may calculate the level of trust R, based on information on answers of the individual driver to a questionnaire about the automated driving control functionality.

<Determination of State of Driver>

FIG. 4 is an explanatory diagram for facilitating the understanding of the driver assistance method according to the example embodiment of the disclosure. The processing unit 112 of the driver assistance apparatus 11 according to the example embodiment may determine what state of a "standard trusting state", a "distrusting state", and an "over-trusting state" the driver who drives the vehicle 10 is in, based on the level of trust R thus calculated.

The term "standard trusting state" as used herein may refer to a driver' state where the level of trust R thus calculated is greater than or equal to a first distrust threshold DTH1 and less than or equal to a first over-trust threshold OTH1 (DTH1≤R≤OTH1). In the standard trusting state, the level of trust R of the driver who drives the vehicle 10 in the automated driving control functionality is an appropriate level. The phrase "the level of trust R is an appropriate level" may refer to a state where the driver who drives the vehicle 10 is allowed to use the automated driving control functionality with a sense of security, rather than the over-trusting state where the driver places too much trust in the automated driving control functionality.

The first distrust threshold DTH1 may be a predetermined threshold based on which whether the driver who drives the vehicle 10 is in the distrusting state with respect to the automated driving control functionality is determined. In one embodiment, the first distrust threshold DTH1 may correspond to a "distrust threshold". The first over-trust threshold OTH1 may be a predetermined threshold based on which whether the driver who drives the vehicle 10 is in the over-trusting state where the driver places too much trust in the automated driving control functionality is determined. In one embodiment, the first over-trust threshold OTH1 may correspond to an "over-trust threshold".

The term "distrusting state" as used herein may refer to a driver's state where the level of trust R thus calculated is less than the first distrust threshold DTH1 (DTH1>R). In the distrusting state, the driver who drives the vehicle 10 may place distrust in the automated driving control functionality. When being in the distrusting state with respect to the automated driving control functionality, the driver who drives the vehicle 10 tends to stop using the automated driving control functionality or continue driving the vehicle 10 with anxiety.

The term "over-trusting state" as used herein may refer to a driver's state where the level of trust R thus calculated is greater than the first over-trust threshold OTH1 (OTH1<R). In the over-trusting state, the driver who drives the vehicle 10 may place too much trust to the automated driving control functionality. When being in the over-trusting state with respect to the automated driving control functionality, the driver who drives the vehicle 10 tends to excessively rely on the automated driving control functionality and thus have difficulties in avoiding a situation that the automated driving control functionality fails to cope with.

The processing unit 112 according to the example embodiment may further determine what level of the distrusting state and what level of the over-trusting state the driver who drives the vehicle 10 is in. In some embodiments, the processing unit 112 may determine what distrusting state among a "first distrusting state", a "second distrusting state", and a "third distrusting state" the driver who drives the vehicle 10 is in. Likewise, the processing unit 112 may determine what over-trusting state among a "first over-trusting state", a "second over-trusting state", and a "third over-trusting state" the driver who drives the vehicle 10 is in.

The first distrusting state may refer to a driver's state where the level of trust R thus calculated is greater than or equal to a second distrust threshold DTH2 and less than the first distrust threshold DTH1 (DTH2≤R<DTH1). The second distrust threshold DTH2 may be less than the first distrust threshold DTH1. In the first distrusting state, the driver who drives the vehicle 10 may place distrust in the automated driving control functionality.

The second distrusting state may refer to a driver's state where the level of trust R thus calculated is greater than or equal to a third distrust threshold DTH3 and less than the second distrust threshold DTH2 (DTH3≤R<DTH2). The third distrust threshold DTH3 may be less than the second distrust threshold DTH2. In the second distrusting state, the driver who drives the vehicle 10 may place greater distrust in the automated driving control functionality than in the first distrusting state.

The third distrusting state may refer to a driver's state where the level of trust R thus calculated is less than the third distrust threshold DTH3 (R<DTH3). In the third distrusting state, the driver who drives the vehicle 10 may place greater distrust in the automated driving control functionality than in the second distrusting state.

In the example embodiment, the degree of distrust that the driver who drives the vehicle 10 places in the automated driving control functionality may increase in the following order: the first distrusting state, the second distrusting state, and the third distrusting state.

The first over-trusting state may refer to a driver's state where the level of trust R thus calculated is greater than the first over-trust threshold OTH1 and less than or equal to a second over-trust threshold OTH2 (OTH1<R≤OTH2). The second over-trust threshold OTH2 may be greater than the first over-trust threshold OTH1. In the first over-trusting state, the driver who drives the vehicle 10 may place too much trust in the automated driving control functionality.

The second over-trusting state may refer to a driver's state where the level of trust R thus calculated is greater than the second over-trust threshold OTH2 and less than or equal to a third over-trust threshold OTH3 (OTH2<R≤OTH3). The third over-trust threshold OTH3 may be greater than the second over-trust threshold OTH2. In the second over-trusting state, the driver who drives the vehicle 10 may place greater trust in the automated driving control functionality than in the first over-trusting state.

The third over-trusting state may refer to a driver's state where the level of trust R thus calculated is greater than the third over-trust threshold OTH3 (R>OTH3). In the third over-trusting state, the driver who drives the vehicle 10 may place greater trust in the automated driving control functionality than in the second over-trusting state.

In the example embodiment, the degree of trust that the driver who drives the vehicle 10 places in the automated driving control functionality may increase in the following order: the first over-trusting state, the second over-trusting state, and the third over-trusting state.

<Step S4: Display Process>

Returning back to FIG. 3, the display processor 112F may execute a display process of displaying at least the recognition result information in Step S4. In the following, Step S4 is described with reference to FIG. 5. FIG. 5 is a flowchart of an example of the display process in the driver assistance method according to the example embodiment of the disclosure.

(Step S41: DTH1≤R≤OTH1?)

In Step S41, the display processor 112F may determine whether the level of trust R calculated in Step S3 described above is greater than or equal to the first distrust threshold DTH1 and less than or equal to the first over-trust threshold OTH1 (DTH1≤R≤OTH1). If the level of trust R thus calculated is determined to be greater than or equal to the first distrust threshold DTH1 and less than or equal to the first over-trust threshold OTH1 (Step S41: YES), the display processor 112F may determine that the driver who drives the vehicle 10 is in the standard trusting state, and may execute a display process in the standard trusting state, as will be described later, in Step S42. In contrast, if the level of trust R thus calculated is determined not to be greater than or equal to the first distrust threshold DTH1 and less than or equal to the first over-trust threshold OTH1 (Step S41: NO), the display processor 112F may execute Step S43, as will be described later.

(Step S42: Display Process in Standard Trusting State)

FIG. 6 illustrates a display example to be displayed when the driver who drives the vehicle 10 is in the standard trusting state. When the driver who drives the vehicle 10 is in the standard trusting state, the display processor 112F may cause the display 18 to display the recognition result information as information visually recognizable by the vehicle 10 in Step S42.

In the process at Step 42, the display processor 112F may set a display area around the vehicle 10 to a first area A1, as illustrated in FIG. 6. The first area A1 may be a display range of the display 18 in which results of measurement in a first predetermined region A, out of the measurement range in which the surrounding environment recognizer 12 has recognized the surrounding environment of the vehicle 10 in Step S1 described above, are displayed. The first predetermined region A may be included in the measurement range in the real space. Note that the term "display area around the vehicle 10" as used herein may refer to a display range of the display 18 in which the detection objects recognized within the measurement range of the surrounding environment recognizer 12 are displayed in the form of images, such as icons, indicating the detection objects.

FIG. 7 illustrates an example of the first predetermined region A. A distance AL1 from a frontal end of the vehicle 10 present in the first predetermined region A toward the frontal area in the traveling direction may be, for example, 50 meters. A distance AL2 from a rear end of the vehicle 10 toward a rear area in a direction opposite to the traveling direction may be, for example, 10 meters. A distance AL3 from a left-side face of the vehicle 10 present in the first predetermined region A toward a left side of a road L and a distance AL4 from a right-side face of the vehicle 10 present in the first predetermined region A toward a right side of the road L may be each longer than the width of a lane (a vehicle traveling zone) of the road L.

In an application example cause of Step S42, the driver who drives the vehicle 10 may be in the standard trusting state. In this case, the display processor 112F may cause the display disposed in an instrument panel to display an image 20A and an image L1 respectively indicating another vehicle 20 and the road L recognized within the first predetermined region A, out of the detection objects recognized within the measurement range of the surrounding environment recognizer 12 in the real space as illustrated in FIG. 7, together with an image 10A indicating the vehicle 10. Such display allows the driver who drives the vehicle 10 to recognize the presence of the other vehicle 20 around the vehicle 10. The image 10A indicating the vehicle 10 and the image 20A indicating the other vehicle 20 may be each displayed in the form of, but not limited thereto, an icon, and this may similarly apply to the following description. Note that, in the display process in the standard trusting state, the driver is allowed to recognize at which position around the vehicle 10 the other vehicle 20 is present, and a relative position between the vehicle 10 and the other vehicle 20 may not reflect on the process.

(Step S43: R<DTH1?)

In Step S43, the display processor 112F may determine whether the level of trust R calculated in Step S3 described above is less than the first distrust threshold DTH1. If the level of trust R thus calculated is determined to be less than the first distrust threshold DTH1 (Step S43: YES), the display processor 112F may determine that the driver who drives the vehicle 10 is in the distrusting state with respect to the automated driving control functionality, and execute a display process to ease the distrusting state in Steps S45 to S49. In the display process in the distrusting state, the display processor 112F may cause the display 18 to display the recognition result information. In Step S49, which will be described later, of the display process in the distrusting state, the display processor 112F may cause the display 18 to display the recognition result information and the detection object information. In the following, the display process in the distrusting state is described.

<Display Process in Distrusting State>

(Step S45: R≥DTH2?)

In Step S45, the display processor 112F may determine whether the level of trust R calculated in Step S3 described above is greater than or equal to the second distrust threshold DTH2. If the level of trust R thus calculated is determined to be greater than or equal to the second distrust threshold DTH2 (DTH2≤R<DTH1) (Step S45: YES), the display processor 112F may determine that the driver who drives the vehicle 10 is in the first distrusting state, and execute a display process to ease the first distrusting state in Step S46. In contrast, if the level of trust R thus calculated is determined not to be greater than or equal to the second distrust threshold DTH2 (Step S45: NO), the display processor 112F may execute Step S47 as will be described later.

(Step S46: Display Process in First Distrusting State)

FIG. 8 illustrates a display example to be displayed when the driver who drives the vehicle 10 is in the first distrusting state. In Step S46, the display processor 112F may cause the display 18 to display the recognition result information including the data on the kind of the detection object as information visually recognizable by the driver who drives the vehicle 10.

When an automobile 21, a truck 22, and the road L present around the vehicle 10 are recognized in the real space as illustrated in FIG. 7 by the surrounding environment recognition processor 112C in an application example case of Step S46, the display processor 112F may cause the display disposed in the instrument panel to display an image 21A indicating the automobile 21, an image 22A indicating the truck 22, and the image L1 indicating the road L together with the image 10A indicating the vehicle 10, as illustrated in FIG. 8. Unlike in the display process in the standard trusting state in which the images 20A indicating the other vehicles 20 are simply illustrated as illustrated in FIG. 6, different images corresponding to the kinds of the detection objects recognized by the surrounding environment recognition processor 112C may be displayed in the display process in the first distrusting state. In the display process in the first distrusting state, the driver who drives the vehicle 10 is allowed to recognize that the other vehicles 20 around the vehicle 10 are the automobile 21 and the truck 22 and that the objects present around the vehicle 10 have been accurately recognized by the surrounding environment recognition processor 112C. This eases a sense of tension of the driver who drives the vehicle 10 and increases the level of trust of the driver in the automated driving control functionality. It is therefore possible to ease the state of the driver from the first distrusting state to the standard trusting state.

(Step S47: R≥DTH3?)

In Step S47, the display processor 112F may determine whether the level of trust R calculated in Step S3 described above is greater than or equal to the third distrust threshold DTH3 that is less than the second distrust threshold DTH2. If the level of trust R thus calculated is determined to be greater than or equal to the third distrust threshold DTH3 (DTH3≤R<DTH2) (Step S47: YES), the display processor 112F may determine that the driver who drives the vehicle 10 is in the second distrusting state, and execute a display process to ease the second distrusting state (Step S48). In contrast, if the level of trust R thus calculated is determined not to be greater than or equal to the third distrust threshold DTH3 (R<DTH3) (Step S47: NO), the display processor 112F may determine that the driver who drives the vehicle 10 is in the third distrusting state, and execute a display process to ease the third distrusting state (Step S49).

(Step S48: Display Process in Second Distrusting State)

FIG. 9 illustrates a display example to be displayed when the driver who drives the vehicle 10 is in the second distrusting state. In Step S48, the display processor 112F may cause the display 18 to display the recognition result information including data on relative positions of the detection objects as information visually recognizable by the driver who drives the vehicle 10.

When the automobile 21, the truck 22, and the road L present around the vehicle 10 are recognized in the real space as illustrated in FIG. 7 by the surrounding environment recognition processor 112C in an application example case of Step S48, the display processor 112F may cause the display disposed in the instrument panel to display the image 21A indicating the automobile 21, the image 22A indicating the truck 22, and the image L1 indicating the road L together with the image 10A indicating the vehicle 10, as illustrated in FIG. 9. A relative positional relationship of the vehicle 10 with the other vehicles 20 in the real space may be represented as a relative positional relationship of the image 10A with the image 21A and the image 22A, according to a scale of the first area A1.

In the display process in the second distrusting state, the driver who drives the vehicle 10 is allowed to recognize the presence of the automobile 21 and the truck 22 around the vehicle 10 and the relative positions of the automobile 21 and the truck 22 with respect to the vehicle 10. Further, the driver who drives the vehicle 10 is allowed to recognize that the objects present around the vehicle 10 have been accurately recognized by the surrounding environment recognition processor 112C. This eases the sense of tension of the driver who drives the vehicle 10 and increases the level of trust of the driver in the automated driving control functionality. It is therefore possible to ease the state of the driver from the second distrusting state to the standard trusting state.

(Step S49: Display Process in Third Distrusting State)

FIGS. 10 to 12 each illustrate a display example to be displayed when the driver who drives the vehicle 10 is in the third distrusting state. In Step S49, the display processor 112F may cause the display 18 to display the recognition result information and the detection object information including the data on the moving speed of the detection object as information visually recognizable by the driver who drives the vehicle 10.

When the automobile 21, the truck 22, and the road L present around the vehicle 10 are recognized in the real space as illustrated in FIG. 7 by the surrounding environment recognition processor 112C in an application example case of Step S49, the display processor 112F may cause the display disposed in the instrument panel to display the image 21A indicating the automobile 21, the image 22A indicating the truck 22, and the image L1 indicating the road L as the recognition result information, together with text information indicating the moving speeds of the other vehicles 20 as the detection object information, as illustrate in FIG. 10.

In the display process in the third distrusting state, the driver who drives the vehicle 10 is allowed to recognize the presence of the automobile 21 and the truck 22 around the vehicle 10, the relative positions of the automobile 21 and the truck 22 with respect to the vehicle 10, and the moving speeds of the automobile 21 and the truck 22. Further, the driver who drives the vehicle 10 is allowed to recognize that the objects present around the vehicle 10 have been accurately recognized by the surrounding environment recognition processor 112C. This eases the sense of tension of the driver who drives the vehicle 10 and increases the level of trust in the automated driving control functionality. It is therefore possible to ease the state of the driver from the third distrusting state to the standard trusting state.

In the process at Step S49, the display processor 112F may cause the display 18 to display the recognition result information and the detection object information as described above, and change the number of items of the detection object information, in accordance with the level of trust of the driver who drives the vehicle 10 in the driver assistance apparatus 11. In some embodiments, the display processor 112F may increase the number of items of the detection object information as the level of trust of the driver who drives the vehicle 10 in the driver assistance apparatus 11 is lower. An application example case of such a process will now be described.

In an application example case of Step S49, a level of trust R1 calculated by the trust level calculator 112E may be less than the third distrust threshold DTH3 (R1<DTH3). In this case, the display processor 112F may cause the display disposed in the instrument panel to display the image 21A indicating the automobile 21, the image 22A indicating the truck 22, and the image L1 indicating the road L together with the text information indicating the moving speeds of the automobile 21 and the truck 22 present around the vehicle 10, as illustrated in FIG. 10.

If a level of trust R2 calculated by the trust level calculator 112E is less than the third distrust threshold DTH3 and less than the level of trust R1 (R2<R1<DTH3), the display processor 112F may cause the display disposed in the instrument panel to display the image 21A indicating the automobile 21, the image 22A indicating the truck 22, the image L1 indicating the road L, the text information indicating the moving speeds of all the other vehicles 20, and text information indicating acceleration rates of the other vehicles 20, as illustrated in FIG. 11.

If a level of trust R3 calculated by the trust level calculator 112E is less than the third distrust threshold DTH3 and less than the level of trust R2 (R3<R2<R1<DTH3), the display processor 112F may cause the display disposed in the instrument panel to display the image 21A indicating the automobile 21, the image 22A indicating the truck 22, the image L1 indicating the road L, the text information indicating the moving speeds and the acceleration rates of all the other vehicles 20, and text information indicating the kinds of the other vehicles 20, as illustrated in FIG. 12. Non-limiting examples of the kinds of the other vehicles 20 may include an automobile, a large-size vehicle, and a motorcycle.

In the display process in the third distrusting state, the number of items of the text information on the other vehicles 20 may increase as the level of trust of the driver who drives the vehicle 10 in the automated driving control functionality is lower, as described above. This allows the driver who drives the vehicle 10 to acquire a larger number of information items on the other vehicles 20 present around the vehicle 10 as the level of trust of the driver in the automated driving control functionality is lower. Further, the driver who drives the vehicle 10 is allowed to recognize that the objects present around the vehicle 10 have been accurately recognized by the surrounding environment recognition processor 112C. This eases the sense of tension of the driver who drives the vehicle 10 and increases the level of trust of the driver in the automated driving control functionality. It is therefore possible to ease the state of the driver from the third distrusting state to the standard trusting state.

Returning back to FIG. 5, if the level of trust R calculated in Step S3 described above is determined not to be less than the first distrust threshold DTH1, i.e., if the level of trust R is determined to be greater than the first over-trust threshold OTH1 (Step S43: NO), the display processor 112F may determine that the driver who drives the vehicle 10 is in the over-trusting state with respect to the automated driving control functionality, and execute a display process to improve the over-trusting state in Step S44. In the display process in the over-trusting state, the display processor 112F may change the display area around the vehicle 10 to an area different from the first area A1. In some embodiments, the display processor 112F may set the display area narrower as the level of trust of the driver who drives the vehicle 10 in the automated driving control functionality is higher, as in Steps S442 to S445. In the following, the display process in the over-trusting state is described with reference to FIG. 13. FIG. 13 is a flowchart of an example of the display process in the over-trusting state.

<Display Process in Over-trusting State>

(Step S441: R≤OTH2?)

In Step S441, the display processor 112F may determine whether the level of trust R thus calculated is less than or equal to the second over-trust threshold OTH2. If the level of trust R is determined to be less than or equal to the second over-trust threshold (OTH1<R≤OTH2) (Step S441: YES), the display processor 112F may determine that the driver who drives the vehicle 10 is in the first over-trusting state, and execute a display process to improve the first over-trusting state in Step S442. In contrast, if the level of trust R is determined not to be less than or equal to the second over-trust threshold (Step S441: NO), the display processor 112F may perform Step S443 as will be described later.

(Step S442: Display Process in First Over-trusting State)

FIG. 14 illustrates a display example to be displayed when the driver is in the first over-trusting state. In Step S442, the display processor 112F may set the display area around the vehicle 10 narrower than the first area A1 illustrated in FIG. 6, for example.

In the process at Step S442, the display processor 112F may set the display area around the vehicle 10 to a second area B1, as illustrated in FIG. 14. The second area B1 may be a display range of the display 18 in which results of measurement in a second predetermined region B, out of the measurement range in which the surrounding environment recognizer 12 has measured for the surrounding environment of the vehicle 10 in Step S1 described above, are displayed. The second predetermined region B may be included in the measurement range in the real space, and may be narrower than the first predetermined region A.

FIG. 15 illustrates an example of the second predetermined region B. A distance BL1 from the frontal end of the vehicle 10 present in the second predetermined region B toward the frontal area in the traveling direction may be, for example, 25 meters. A distance BL2 from the rear end of the vehicle 10 toward the rear area in the direction opposite to the traveling direction may be, for example, 10 meters. A distance BL3 from the left-side face of the vehicle 10 present in the second predetermined region B toward the left side of the road L and a distance BL4 from the right-side face of the vehicle 10 present in the second predetermined region B toward the right side of the road L may be each longer than the width of the lane (the vehicle traveling zone) of the road L.

In an application example case of Step S442, the driver who drives the vehicle 10 may be in the first over-trusting state. In this case, the display processor 112F may cause the display disposed in the instrument panel to display the image 20A and the image L1 respectively indicating the other vehicle 20 and the road L recognized within the second predetermined region B, out of the detection objects recognized within the measurement range of the surrounding environment recognizer 12 in the real space as illustrated in FIG. 15, as the recognition result information, together with the image 10A indicating the vehicle 10. In the display process in the first over-trusting state, the display area around the vehicle 10 may be narrowed. This urges the driver who drives the vehicle 10 to have the sense of tension. It is therefore possible to improve the state of the driver who drives the vehicle 10 from the first over-trusting state to the standard trusting state.

(Step S443: R≤OTH3?)

In Step S443, the display processor 112F may determine whether the level of trust R calculated in Step S3 described above is less than or equal to the third over-trust threshold OTH3. If the level of trust R is determined to be less than or equal to the third over-trust threshold OTH3 (OTH2<R≤OTH3) (Step S443: YES), the display processor 112F may determine that the driver who drives the vehicle 10 is in the second over-trusting state, and execute a display process to improve the second over-trusting state in Step S444. In contrast, if the level of trust R thus calculated is determined not to be less than or equal to the third over-trust threshold OTH3, i.e., if the level of trust R is determined to be greater than the third over-trust threshold OTH3 (R>OTH3) (Step S443: NO), the display processor 112F may determine that the driver who drives the vehicle 10 is in the third over-trusting state, and execute a display process to improve the third over-trusting state in Step S445.

(Step S444: Display Process in Second Over-trusting State)

FIG. 16 illustrates a display example to be displayed when the driver is in the second over-trusting state. In Step S444, the display processor 112F may set the display area around the vehicle 10 narrower than the second area B1 illustrated in FIG. 14, for example.

In the process at Step S443, the display processor 112F may set the display area around the vehicle 10 to a third area C1, as illustrated in FIG. 16. The third area C1 may be a display range of the display 18 in which results of measurement in a third predetermined region C, out of the measurement range in which the surrounding environment recognizer 12 has measured for the surrounding environment of the vehicle 10 in Step S1 described above, are displayed. The third predetermined region C may be included in the measurement range in the real space, and may be narrower than the second predetermined region B.

FIG. 17 illustrates an example of the third predetermined region C. A distance from the frontal end of the vehicle 10 present in the third predetermined region C toward the frontal area in the traveling direction may be 0 meters. A distance CL1 from the rear end of the vehicle 10 toward the rear area in the direction opposite to the traveling direction may be, for example, 10 meters. A distance CL2 from the left-side face of the vehicle 10 present in the third predetermined region C toward the left side of the road L and a distance CL3 from the right-side face of the vehicle 10 present in the third predetermined region C toward the right side of the road L may be each longer than the width of the lane (the vehicle traveling zone) of the road L.

In an application example case of Step S443, the driver who drives the vehicle 10 may be in the second over-trusting state. In this case, the display processor 112F may cause the display disposed in the instrument panel to display the image 20A and the image L1 respectively indicating the other vehicle 20 and the road L recognized within the third predetermined region C, out of the detection objects recognized within the measurement range of the surrounding environment recognizer 12 in the real space illustrated in FIG. 17, as the recognition result information, together with the image 10A indicating the vehicle 10. In the display process in the third over-trusting state, the image indicating the other vehicle 20 present in the frontal area in the traveling direction of the vehicle 10 may not be displayed on the display 18. This urges the driver who drives the vehicle 10 to have the sense of tension and pay his/her attention to the frontal area in the traveling direction. It is therefore possible to improve the state of the driver who drives the vehicle 10 from the second over-trusting state to the standard trusting state.

(Step S445: Display Process in Third Over-trusting State)

FIG. 18 illustrates a display example to be displayed when the driver is in the third over-trusting state. In Step S445, the display processor 112F may set the display area around the vehicle 10 narrower than the third area C1 illustrated in FIG. 16, for example.

In the process at Step S445, the display processor 112F may set the display area around the vehicle 10 to a fourth area D1, as illustrated in FIG. 18. The fourth area D1 may be a display range of the display 18 in which results of measurement in a fourth predetermined region D, out of the measurement range that the surrounding environment recognizer 12 has measured for the surrounding environment of the vehicle 10 in Step S1 described above, are displayed. The fourth predetermined region D may be included in the measurement range in the real space, and may be narrower than the third predetermined region C. In the fourth predetermined region D, the other vehicle 20 present around the vehicle 10 may not be included.

FIG. 19 illustrates an example of the fourth predetermined region D. A distance DL1 from the frontal end of the vehicle 10 present in the fourth predetermined region D toward the frontal area in the traveling direction may be shorter than a distance between the vehicle 10 and the other vehicle 20 present ahead of the vehicle 10 in the traveling direction. A distance DL2 from the rear end of the vehicle 10 present in the fourth predetermined region D toward the rear area in the direction opposite to the traveling direction may be shorter than a distance between the vehicle 10 and the other vehicle 20 present behind the vehicle 10 in the direction opposite to the traveling direction. A distance DL3 from the left-side face of the vehicle 10 present in the fourth predetermined region D toward the left side of the road L may be shorter than a distance from the vehicle 10 to another vehicle 20 present on the left side with respect to the vehicle 10. A distance DL4 from the right-side face of the vehicle 10 present in the fourth predetermined region D toward the right side of the road L may be shorter than a distance from the vehicle 10 to another vehicle 20 present on the right side with respect to the vehicle 10.

In an application example case of Step S445, the driver who drives the vehicle 10 may be in the third over-trusting state. In this case, the display processor 112F may cause the display disposed in the instrument panel to display the image L1 indicating the road L recognized within the fourth predetermined region D, out of the detection objects recognized within the measurement range of the surrounding environment recognizer 12 in the real space illustrated in FIG. 19, as the recognition result information, together with the image 10A indicating the vehicle 10. In the display process in the third over-trusting state, the image indicating the other vehicle 20 present around the vehicle 10 may not be displayed on the display 18. This urges the driver who drives the vehicle 10 to have the sense of tension and pay his/her attention to the surroundings of the vehicle 10. It is therefore possible to improve the state of the driver who drives the vehicle 10 from the third over-trusting state to the standard trusting state.

According to the example embodiment described above, the driver assistance apparatus 11 includes the one or more processors and the one or more memories communicably coupled to the one or more processors. The one or more processors are configured to: acquire information on the surrounding environment of the vehicle 10; recognize the surrounding environment, based on the information on the surrounding environment; calculate the level of trust of the driver in the automated driving control functionality of the automated driving processor 112D; display at least the recognition result information; and change, when the recognition result information is displayed, the number of information items indicating the display area around the vehicle 10 or the states of the detection objects present around the vehicle 10, in accordance with the level of trust.

According to the driver assistance apparatus 11 described above, even when the driver who drives the vehicle 10 is in the distrusting state where the driver places distrust in the automated driving control functionality, it is possible to ease the distrusting state of the driver toward the standard trusting state by changing, with the display processor 112F, the number of information items to an appropriate number corresponding to the distrusting state. Further, even when the driver who drives the vehicle 10 is in the over-trusting state where the driver places too much trust in the automated driving control functionality, it is possible to improve the over-trusting state of the driver toward the standard trusting state by changing, with the display processor 112F, the display area around the vehicle 10 to an appropriate area corresponding to the over-trusting state. It is therefore possible for the driver assistance apparatus 11 according to the example embodiment to improve the over-trusting state or the distrusting state of the driver who drives the vehicle 10 with respect to the automated driving control functionality to an appropriate state.

Further, the one or more processors according to the example embodiment may determine that the driver is in the over-trusting state with respect to the automated driving control functionality when the level of trust R thus calculated is greater than the first over-trust threshold OTH1. When the driver is determined to be in the over-trusting state, the one or more processor may change the display area around the vehicle 10 to an area different from the first area A1. Accordingly, even when the driver who drives the vehicle 10 is in the over-trusting state where the driver places too much trust in the automated driving control functionality, it is possible to improve the over-trusting state of the driver toward the standard trusting state by changing, with the display processor 112F, the display area around the vehicle 10 to an appropriate area different from the first area A1 and corresponding to the over-trusting state.

Further, the one or more processors according to the example embodiment may narrow the display area around the vehicle 10 as the level of trust of the driver in the automated driving control functionality is higher. According to the example embodiment, the driver who drives the vehicle 10 is urged to have the sense of tension when the display area around the vehicle 10 is narrowed. It is therefore possible to improve the over-trusting state of the driver toward the standard trusting state.

Further, the one or more processors according to the example embodiment may determine that the driver is in the distrusting state with respect to the automated driving control functionality when the level of trust R thus calculated is less than the first distrust threshold DTH1. When the driver is determined to be in the distrusting state, the one or more processors may change the number of information items. According to the example embodiment, even when the driver who drives the vehicle 10 is in the distrusting state with respect to the automated driving control functionality, it is possible to increase the level of trust in the automated driving control functionality and to ease the distrusting state of the driver toward the standard trusting state by changing, with the display processor 112F, the number of information items to an appropriate number corresponding to the distrusting state.

Further, the one or more processors according to the example embodiment may increase the number of information items as the level of trust of the driver in the automated driving control functionality is lower. According to the example embodiment, even when the driver who drives the vehicle 10 is in the distrusting state where the driver places distrust in the automated driving control functionality, it is possible to ease the distrusting state of the driver toward the standard trusting state by increasing, with the display processor 112F, the number of information items.

According to the example embodiment described above, the driver assistance method includes: acquiring the information on the surrounding environment of the vehicle 10; recognizing the surrounding environment, based on the information on the surrounding environment; calculating the level of trust of the driver in the automated driving control functionality of the automated driving processor 112D; displaying at least recognition result information; and changing the number of information items indicating the display area around the vehicle 10 or the states of the detection objects present around the vehicle 10, in accordance with the level of trust when the recognition result information is displayed.

According to the driver assistance method, even when the driver is in the distrusting state where the driver places distrust in the automated driving control functionality, it is possible to ease the distrusting state of the driver toward the standard trusting state by changing, with the display processor 112F, the number of information items to an appropriate number corresponding to the distrusting state. Further, even when the driver who drives the vehicle 10 is in the over-trusting state where the driver places too much trust in the automated driving control functionality, it is possible to improve the over-trusting state of the driver toward the standard trusting state by changing, the display processor 112F, the display area around the vehicle 10 to an appropriate area corresponding to the over-trusting state. According to the driver assistance method of the example embodiment described above, it is possible to improve the over-trusting state or the distrusting state of the driver who drives the vehicle 10 with respect to the automated driving control functionality of the automated driving processor 112D to an appropriate state.

2. Modification Examples

Although some example embodiments of the disclosure have been described so far, the disclosure is not limited to the example embodiments described above, and various modification may be made to the disclosure. In the following, some modification examples applicable to the example embodiments described above will be described. The example embodiments described above may be appropriately modified into any one or more modification examples described below to the extent that no contradiction occurs.

Modification Example 1

In the example embodiment described above, the display processor 112F may cause the text information on the other vehicle 20 to be displayed when the driver who drives the vehicle 10 is in the distrusting state; however, this is a non-limiting example. In some embodiments, the display processor 112F may cause the information on the moving speed or the acceleration rate of the other vehicle 20 to be displayed in the form of a level meter. In some embodiments, the display processor 112F may cause the information on the moving speed or the acceleration rate of the other vehicle 20 to be displayed in a size that differs depending on the magnitude of value of the moving speed or the acceleration rate.

Modification Example 2

In the example embodiment described above, the kind and position of the detection object recognized may be identified, and the moving speed of the detection object may be calculated in the surrounding environment recognition process; however, this is a non-limiting example. In some embodiments, the driver assistance apparatus may acquire the information indicating the kind, position, and moving speed of the detection object recognized, via the vehicle-to-vehicle communication, and cause the information to be displayed when the display process in the distrusting state is performed.

Modification Example 3

In the application example case of the example embodiment described above, the detection objects recognized in the surrounding environment recognition process may be vehicles and roads; however, this is a non-limiting example. Any detection objects different from vehicles or roads may be recognized in the surrounding environment recognition process according to the example embodiment described above. In this case, the driver assistance apparatus may cause the recognition result information and the detection object information on the detection objects different from vehicles and roads to be displayed when the display process in the distrusting state or the over-trusting state is performed.

3. Supplementary Explanation

The driver assistance apparatus and the driver assistance method described in the foregoing example embodiments are applicable to an automobile; however, the driver assistance apparatus and the driver assistance method according to the example embodiments of the disclosure may be applied to a mobile body other than an automobile, and an application of the example embodiments of the disclosure is not limited to a particular application.

The effects described herein are merely illustrative and non-limiting examples. That is, the disclosure may provide any other effects that are apparent for persons skilled in the scope of the description herein, in the art in addition to or in place of the effects described above.

Although some example embodiments of the disclosure have been described in the foregoing by way of example with reference to the accompanying drawings, the disclosure is by no means limited to the example embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

A part of the functionality of the driver assistance apparatus described in the foregoing example embodiments may be implemented by any other devices. In some embodiments, all or a part of the steps (Steps S1 to S4) in the driver assistance method according to the example embodiment of the disclosure may be executed by another vehicle mutually and communicably coupled to the vehicle to be assisted via the vehicle-to-vehicle communication. In some embodiments, all or a part of the steps (Steps S1 to S4) in the driver assistance method according to the example embodiment of the disclosure may be executed by an information processor such as a cloud server mutually and communicably coupled to the vehicle to be assisted via a communication network.

In the foregoing example embodiments, the driver assistance apparatus may be an ECU mounted in the vehicle; however, the technology according to an embodiment of the disclosure is not limited to the example. In some embodiments, the driver assistance apparatus may be a portable device configured to communicate with a device different from a vehicle and transmit a driving command to any display. Non-limiting examples of the portable device may include a lap-top computer, a portable phone, a smartphone, and a tablet device.

Further, the technology according to any embodiment of the disclosure may be implemented as a vehicle equipped with the driver assistance apparatus described in the foregoing example embodiment, a driver assistance method performed by the driver assistance apparatus, a computer program that causes a computer to serve as the driver assistance apparatus, and a non-transitory recording medium containing the computer program.

4. Supplementary Note

The following aspects are obtainable from the example embodiments described above. One aspect of the disclosure provides a driver assistance apparatus configured to assist a driver in driving a vehicle. The driver is a person who drives the vehicle. The driver assistance apparatus includes one or more processors and one or more memories communicably coupled to the one or more processors. The one or more processors are configured to: acquire information on a surrounding environment of the vehicle; recognize the surrounding environment, based on the information on the surrounding environment; calculate a level of trust of the driver in the driver assistance apparatus; display at least recognition result information on a result of recognizing the surrounding environment; and change, when the recognition result information is displayed, the number of information items indicating a display area around the vehicle or a state of a detection object present around the vehicle, in accordance with the level of trust.

According to the driver assistance apparatus of the aspect, even when the driver is in the distrusting state where the driver places distrust in the driver assistance apparatus, it is possible to ease the distrusting state of the driver toward the standard trusting state by changing, with the driver assistance apparatus, the number of information items to an appropriate number corresponding to the distrusting state. Further, even when the driver who drives the vehicle is in the over-trusting state where the driver places too much trust in the driver assistance apparatus, it is possible to improve the over-trusting state of the driver toward the standard trusting state by changing, with the driver assistance apparatus, the display area around the vehicle to an appropriate area corresponding to the over-trusting state. It is therefore possible for the driver assistance apparatus according to the aspect of the disclosure to improve the over-trusting state or the distrusting state of the driver who drives the vehicle with respect to the driver assistance apparatus to an appropriate state.

According to one aspect of the disclosure, the one or more processors may determine that the driver is in the standard trusting state with respect to the driver assistance apparatus when the level of trust thus calculated is less than or equal to a predetermined over-trust threshold based on which whether the driver is in an over-trusting state with respect to the driver assistance apparatus is determined and greater than or equal to a predetermined distrust threshold based on which whether the driver is in a distrusting state with respect to the driver assistance apparatus is determined. When the driver is determined to be in the standard trusting state, the one or more processors may set the display area to a first area. According to the aspect, an appropriate amount of the information on the objects present within an appropriate area around the vehicle is displayed. This allows the driver who drives the vehicle to use the driver assistance apparatus with the sense of security, without giving too much trust in the driver assistance apparatus.

According to one aspect of the disclosure, the one or more processors may determine that the driver is in the over-trusting state with respect to the driver assistance apparatus when the level of trust thus calculated is greater than the predetermined over-trust threshold. When the driver is determined to be in the over-trusting state, the one or more processors may change the display area to an area different from the first area. According to the aspect, even when the driver who drives the vehicle is in the over-trusting state where the driver places too much trust in the driver assistance apparatus, it is possible to improve the over-trusting state of the driver toward the standard trusting state by changing, with the driver assistance apparatus, the display area around the vehicle to an appropriate area different from the first area and corresponding to the over-trusting state.

According to one aspect of the disclosure, the one or more processors may narrow the display area as the level of trust of the driver in the driver assistance apparatus is higher. According to the aspect, the driver who drives the vehicle is urged to have the sense of tension when the display area around the vehicle is narrowed. Accordingly, it is possible to improve the over-trusting state of the driver toward the standard trusting state.

According to one aspect of the disclosure, the one or more processors may determine that the driver is in the distrusting state with respect to the driver assistance apparatus when the level of trust thus calculated is less than the predetermined distrust threshold. When the driver is determined to be in the distrusting state, the one or more processors may change the number of information items. According to the aspect, even when the driver who drives the vehicle is in the distrusting state where the driver places distrust in the driver assistance apparatus, it is possible to ease the distrusting state of the driver toward the standard trusting state by changing, with the driver assistance apparatus, the number of the information items to an appropriate number corresponding to the distrusting state.

According to one aspect of the disclosure, the number of information items may be increased as the level of trust of the driver is lower. According to the aspect, even when the driver who drives the vehicle is in the distrusting state where the driver places distrust in the driver assistance apparatus, it is possible to ease the distrusting state of the driver toward the standard trusting state by increasing, with the driver assistance, the number of information items.

One aspect of the disclosure provides a driver assistance method of assisting a driver in driving a vehicle. The driver is a person who drives the vehicle. The driver assistance method includes: acquiring information on a surrounding environment of the vehicle; recognizing the surrounding environment, based on the information on the surrounding environment; calculating a level of trust of the driver in the driver assistance apparatus; displaying at least recognition result information on a result of recognizing the surrounding environment; and changing, when the recognition result information is displayed, the number of information items indicating a display area around the vehicle or a state of a detection object present around the vehicle, in accordance with the level of trust.

According to the driver assistance method of the aspect, even when the driver who drives the vehicle is in the distrusting state where the driver places distrust in the driver assistance apparatus, it is possible to ease the distrusting state of the driver toward the standard trusting state by changing, with the driver assistance apparatus, the number of information items to an appropriate number corresponding to the distrusting state. Further, even when the driver who drives the vehicle is in the over-trusting state where the driver places too much trust in the driver assistance apparatus, it is possible to improve the over-trusting state of the driver toward the standard trusting state by changing, with the driver assistance apparatus, the display area around the vehicle to an appropriate area corresponding to the over-trusting state. It is therefore possible for the driver assistance method according to the aspect of the disclosure to improve the over-trusting state or the distrusting state of the driver who drives the vehicle with respect to the driver assistance apparatus to an appropriate state.

One aspect of the disclosure provides a computer program to be applied to a driver assistance apparatus configured to assist a driver in driving a vehicle. The driver is a person who drives the vehicle. The computer program is configured to cause, when executed by the one or more processors, the one or more processors to implement a method including: acquiring information on a surrounding environment of the vehicle; recognizing the surrounding environment, based on the information on the surrounding environment; calculating a level of trust of the driver in the driver assistance apparatus; displaying at least recognition result information on a result of recognizing the surrounding environment; and changing, when the recognition result information is displayed, the number of information items indicating a display area around the vehicle or a state of a detection object present around the vehicle, in accordance with the level of trust.

According to the computer program of the aspect, even when the driver who drives the vehicle is in the distrusting state where the driver places distrust in the driver assistance apparatus, it is possible to ease the distrusting state of the driver toward the standard trusting state by changing, when the computer program is executed by the one or more processors, the number of information items to an appropriate number corresponding to the distrusting state. Further, even when the driver who drives the vehicle is in the over-trusting state where the driver places too much trust in the driver assistance apparatus, it is possible to improve the over-trusting state of the driver toward the standard trusting state by changing, when the computer program is executed by the one or more processors, the display area around the vehicle to an appropriate area corresponding to the over-trusting state.

One aspect of the disclosure provides a non-transitory computer readable recording medium containing a computer program to be applied to a driver assistance apparatus. The driver assistance apparatus is configured to assist a driver in driving a vehicle. The computer program is configured to cause, when executed by the one or more processors, the one or more processors to implement a method including: acquiring information on a surrounding environment of the vehicle; recognizing the surrounding environment, based on the information on the surrounding environment; calculating a level of trust of the driver in the driver assistance apparatus; displaying at least recognition result information on a result of recognizing the surrounding environment; and changing, when the recognition result information is displayed, the number of information items indicating a display area around the vehicle or a state of a detection object present around the vehicle, in accordance with the level of trust.

According to the non-transitory computer readable recording medium of the aspect, even when the driver who drive the vehicle is in the distrusting state where the driver places distrust in the driver assistance apparatus, it is possible to ease the distrusting state of the driver toward the standard trusting state by changing, with the one or more processors executing the computer program, the number of information items to an appropriate number corresponding to the distrusting state. Further, even when the driver who drives the vehicle is in the over-trusting state where the driver places too much trust in the driver assistance apparatus, it is possible to change, with the one or more processors, the display area around the vehicle to an appropriate area corresponding to the over-trusting state.

According to any embodiment of the disclosure described above, it is possible to improve the over-trusting state or the distrusting state of the driver with respect to the driver assistance apparatus to an appropriate state.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a," "an," and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially" and its variants having the similar meaning thereto are defined as being largely but not necessarily wholly what is specified as understood by one of ordinary skill in the art.

The term "disposed on/provided on/" and its variants having the similar meaning thereto as used herein refer to elements disposed directly in contact with each other or indirectly by having intervening structures therebetween.

The processing unit 112 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processing unit 112 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processing unit 112 illustrated in FIG. 2.

The invention claimed is:

1. A driver assistance apparatus configured to assist a driver in driving a vehicle, the driver being a person who drives the vehicle, the driver assistance apparatus comprising:

one or more processors; and one or more memories communicably coupled to the one or more processors, wherein the one or more processors are configured to;

acquire information on a surrounding environment of the vehicle;

recognize the surrounding environment based on the information, including recognizing one or more detected objects present around the vehicle;

calculate a level of trust of the driver in the driver assistance apparatus, display, in a display area of a display, recognition result information including an image indicating the vehicle and one or more images indicating the one or more detected objects;

determine that the driver is in a standard trusting state with respect to the driver assistance apparatus when the trust level is greater than or equal to a predetermined distrust threshold and less than or equal to a predetermined over-trust threshold;

set the display area to a first area when the driver is in the standard trusting state, the first area being a display range of the display in which results of measurement in a first predetermined region around the vehicle are displayed;

determine that the driver is in a distrusting state when the trust level is less than the predetermined distrust threshold, and increase, when the driver is in the distrusting state, a number of information items indicating a state of at least one of the one or more detected objects displayed in the display area; and determine that the driver is in an over-trusting state when the trust level is greater than the predetermined over-trust threshold, and set, when the driver is in the over-trusting state, the display area to an area different from the first area.

2. The driver assistance apparatus according to claim 1, wherein the one or more processors are configured to, when the driver is in the over-trusting state, set the display area narrower than the first area.

3. The driver assistance apparatus according to claim 2, wherein the one or more processors are configured to narrow the display area as the trust level is higher.

4. The driver assistance apparatus according to claim 1, wherein the one or more processors are configured to, when the driver is in the distrusting state, increase the number of information items as the trust level is lower.

5. The driver assistance apparatus according to claim 4, wherein the information items include information indicating at least one of a kind, a relative position, or a moving speed of at least one of the one or more detected objects.

6. The driver assistance apparatus according to claim 1, wherein the one or more processors are configured to calculate the trust level based on a frequency of use of an automated driving control functionality by the driver.

7. The driver assistance apparatus according to claim 1, wherein the one or more processors are configured to calculate the trust level based on a frequency of driving operation performed by the driver against an operation command from an automated driving processor during activation of an automated driving control functionality.

8. The driver assistance apparatus according to claim 1, wherein the one or more processors are configured to calculate the trust level based on information recorded during driving of the vehicle by the driver or during use of the vehicle by the driver.

9. A driver assistance method of assisting a driver in driving a vehicle, the driver being a person who drives the vehicle, the driver assistance method comprising:

acquiring information on a surrounding environment of the vehicle;

recognizing the surrounding environment based on the information, including recognizing one or more detected objects present around the vehicle;

calculating a level of trust of the driver in a driver assistance apparatus;

displaying, in a display area of a display, recognition result information including an image indicating the vehicle and one or more images indicating the one or more detected objects;

determining that the driver is in a standard trusting state when the trust level is greater than or equal to a predetermined distrust threshold and less than or equal to a predetermined over-trust threshold;

setting the display area to a first area when the driver is in the standard trusting state, the first area being a display range of the display in which results of measurement in a first predetermined region around the vehicle are displayed;

determining that the driver is in a distrusting state when the trust level is less than the predetermined distrust threshold, and increase, when the driver is in the distrusting state, a number of information items indicating a state of at least one of the one or more detected objects displayed in the display area; and determining that the driver is in an over-trusting state when the trust level is greater than the predetermined over-trust threshold, and set, when the driver is in the over-trusting state, the display area to an area different from the first area.

10. A non-transitory computer readable recording medium containing a computer program to be applied to a driver assistance apparatus, the driver assistance apparatus being configured to assist a driver in driving a vehicle, the driver being a person who drives the vehicle, the computer program causing, when executed by one or more processors, the one or more processors to implement a method, the method comprising:

acquiring information on a surrounding environment of the vehicle;

recognizing the surrounding environment based on the information, including recognizing one or more detected objects present around the vehicle;

calculating a level of trust of the driver in the driver assistance apparatus;

displaying, in a display area of a display, recognition result information including an image indicating the vehicle and one or more images indicating the one or more detected objects;

determining that the driver is in a standard trusting state when the trust level is greater than or equal to a predetermined distrust threshold and less than or equal to a predetermined over-trust threshold;

setting the display area to a first area when the driver is in the standard trusting state, the first area being a display range of the display in which results of measurement in a first predetermined region around the vehicle are displayed;

determining that the driver is in a distrusting state when the trust level is less than the predetermined distrust threshold, and increase, when the driver is in the distrusting state, a number of information items indicating a state of at least one of the one or more detected objects displayed in the display area; and determining that the driver is in an over-trusting state when the trust level is greater than the predetermined over-trust threshold, and set, when the driver is in the over-trusting state, the display area to an area different from the first area.

* * * * *